US012358518B2

(12) United States Patent
Sjolin et al.

(10) Patent No.: US 12,358,518 B2
(45) Date of Patent: Jul. 15, 2025

(54) AUTONOMOUS VEHICLE AUTOMATED SCENARIO CHARACTERIZATION

(71) Applicant: EMBARK TRUCKS, INC., San Francisco, CA (US)

(72) Inventors: Marcus Sjolin, San Francisco, CA (US); David Watson, Oakland, CA (US)

(73) Assignee: EMBARK TRUCKS, INC., San Francisco, CA (US)

( * ) Notice: Subject to any disclaimer, the term of this patent is extended or adjusted under 35 U.S.C. 154(b) by 297 days.

(21) Appl. No.: 17/484,550

(22) Filed: Sep. 24, 2021

(65) Prior Publication Data

US 2023/0102929 A1    Mar. 30, 2023

(51) Int. Cl.
| | |
|---|---|
| *B60W 50/06* | (2006.01) |
| *B60W 30/18* | (2012.01) |
| *B60W 40/04* | (2006.01) |
| *B60W 50/02* | (2012.01) |
| *B60W 60/00* | (2020.01) |
| *G07C 5/00* | (2006.01) |

(52) U.S. Cl.
CPC ...... *B60W 50/06* (2013.01); *B60W 30/18163* (2013.01); *B60W 40/04* (2013.01); *B60W 50/0205* (2013.01); *B60W 60/001* (2020.02); *G07C 5/008* (2013.01)

(58) Field of Classification Search
CPC .......... B60W 50/06; B60W 30/18163; B60W 40/04; B60W 50/0205; B60W 60/001; G07C 5/008; G08G 1/164; G08G 1/166; G08G 1/167; G06F 9/4498; G06N 5/043
See application file for complete search history.

(56) References Cited

U.S. PATENT DOCUMENTS

| | | | |
|---|---|---|---|
| 5,474,453 A * | 12/1995 | Copperman | A63F 13/497 |
| | | | 434/69 |
| 6,345,228 B1 * | 2/2002 | Lees | G08G 1/042 |
| | | | 331/65 |
| 10,317,901 B2 * | 6/2019 | Oder | G05D 1/0255 |
| 10,459,441 B2 * | 10/2019 | Zhuang | B60W 50/035 |
| 10,482,003 B1 * | 11/2019 | Bondor | G06F 30/15 |
| 10,546,197 B2 * | 1/2020 | Shrestha | G06N 20/00 |
| 11,084,504 B2 * | 8/2021 | Wray | B60W 30/18154 |
| 11,137,766 B2 * | 10/2021 | Gier | G06F 9/4498 |

(Continued)

*Primary Examiner* — Angelina M Shudy
(74) *Attorney, Agent, or Firm* — McDermott Will & Emery LLP

(57) ABSTRACT

A system and method including receiving a plurality of messages generated by a vehicle, each of the messages being associated with an indicated topic; initializing one or more state machines, each state machine preconfigured with a one or more specified state parameters to define a specific scenario, the initializing commencing an execution of the one or more state machines; querying the plurality of messages by the one or more state machines, each state machine querying for messages having an indicated topic associated with the querying state machine; updating, at one or more of a sequence of time intervals of a time period, the one or more state machines based on state transitions determined for each state machine; updating, based on each of the one or more state machines, a scenario record for each of the one or more state machines; and storing the updated scenario record in a data store.

18 Claims, 16 Drawing Sheets

(56) References Cited

U.S. PATENT DOCUMENTS

| | | | |
|---|---|---|---|
| 11,352,013 B1* | 6/2022 | Srinivasan | B60W 40/04 |
| 11,386,325 B1* | 7/2022 | Srinivasan | G06N 7/01 |
| 11,477,030 B2* | 10/2022 | Troia | G06F 11/3612 |
| 11,610,504 B2* | 3/2023 | Fok | G09B 9/052 |
| 11,644,830 B1* | 5/2023 | Gate | G05D 1/0038 |
| | | | 701/2 |
| 11,698,910 B1* | 7/2023 | Zheng | G06F 16/243 |
| | | | 707/723 |
| 11,891,088 B1* | 2/2024 | Kobilarov | G07C 5/0808 |
| 11,912,301 B1* | 2/2024 | Hendy | G06N 3/08 |
| 11,914,358 B2* | 2/2024 | Upadhyay | G07C 5/006 |
| 11,915,115 B2* | 2/2024 | Deselaers | G06N 20/00 |
| 12,030,520 B2* | 7/2024 | Ödblom | G06F 11/3668 |
| 12,046,131 B2* | 7/2024 | Ramamoorthy | G08G 1/0116 |
| 2002/0133325 A1* | 9/2002 | Hoare, II | G06F 30/20 |
| | | | 703/17 |
| 2005/0131597 A1* | 6/2005 | Raz | G09B 19/167 |
| | | | 701/29.1 |
| 2006/0149582 A1* | 7/2006 | Hawkins | G06Q 10/067 |
| | | | 705/348 |
| 2008/0133066 A1* | 6/2008 | Takenaka | B62D 6/003 |
| | | | 701/1 |
| 2010/0064026 A1* | 3/2010 | Brown | G05B 19/4185 |
| | | | 709/217 |
| 2011/0161926 A1* | 6/2011 | Cruise | G06F 8/35 |
| | | | 717/113 |
| 2014/0317287 A1* | 10/2014 | Ziekow | H04L 47/125 |
| | | | 709/224 |
| 2015/0312655 A1* | 10/2015 | Balakrishnan | G07C 5/0858 |
| | | | 340/870.07 |
| 2016/0266579 A1* | 9/2016 | Chen | G08G 5/0052 |
| 2016/0300403 A1* | 10/2016 | Harter | G07C 5/008 |
| 2017/0098162 A1* | 4/2017 | Ellenbogen | G06V 20/52 |
| 2017/0192517 A1* | 7/2017 | Hygh | A63F 13/212 |
| 2018/0107230 A1* | 4/2018 | Gupta | G06F 16/2282 |
| 2018/0314921 A1* | 11/2018 | Mercep | G01S 13/87 |
| 2018/0348785 A1* | 12/2018 | Zheng | G06N 20/00 |
| 2018/0349785 A1* | 12/2018 | Zheng | G06N 7/01 |
| 2019/0049968 A1* | 2/2019 | Dean | G06V 20/58 |
| 2019/0196464 A1* | 6/2019 | Lockwood | G05D 1/0016 |
| 2019/0213103 A1* | 7/2019 | Morley | G06F 11/3692 |
| 2019/0236862 A1* | 8/2019 | Mercep | G08G 1/165 |
| 2019/0259292 A1* | 8/2019 | Williams | G06F 18/24323 |
| 2019/0322287 A1* | 10/2019 | Escrig-Monferrer | |
| | | | B60W 30/18109 |
| 2019/0329771 A1* | 10/2019 | Wray | B60W 30/18154 |
| 2019/0339702 A1* | 11/2019 | Isele | G06N 7/01 |
| 2020/0005645 A1* | 1/2020 | Wray | G08G 1/166 |
| 2020/0039520 A1* | 2/2020 | Misu | B60W 60/0013 |
| 2020/0081822 A1* | 3/2020 | Cui | G06F 11/32 |
| 2020/0089247 A1* | 3/2020 | Shkurti | G05D 1/0257 |
| 2020/0124429 A1* | 4/2020 | Zhang | G06Q 10/047 |
| 2020/0174471 A1* | 6/2020 | Du | G08G 1/0129 |
| 2020/0186967 A1* | 6/2020 | Ghatak | G06Q 40/12 |
| 2020/0250438 A1* | 8/2020 | Schachter | G01S 17/931 |
| 2020/0285244 A1* | 9/2020 | Gier | G05D 1/0246 |
| 2020/0372366 A1* | 11/2020 | Badia | G06N 3/088 |
| 2020/0406905 A1* | 12/2020 | Dong | B60W 60/00274 |
| 2020/0409824 A1* | 12/2020 | Balasubramanian | |
| | | | G06F 11/3664 |
| 2020/0410255 A1* | 12/2020 | Guo | G06N 3/084 |
| 2021/0016777 A1* | 1/2021 | Weiser | B60W 30/18154 |
| 2021/0029147 A1* | 1/2021 | McCanty | H04W 12/009 |
| 2021/0241137 A1* | 8/2021 | Jain | G16H 10/20 |
| 2021/0287262 A1* | 9/2021 | Abbott | G06Q 30/0282 |
| 2021/0303882 A1* | 9/2021 | Mallela | G01C 21/005 |
| 2021/0312725 A1* | 10/2021 | Milton | G07C 5/008 |
| 2021/0344499 A1* | 11/2021 | Troia | H04L 9/0643 |
| 2021/0354707 A1* | 11/2021 | Patnala | G07C 5/0808 |
| 2021/0354729 A1* | 11/2021 | Ng | B60W 60/0018 |
| 2021/0370972 A1* | 12/2021 | Bagschik | B60W 50/045 |
| 2021/0370980 A1* | 12/2021 | Ramamoorthy | G06V 20/56 |
| 2022/0012624 A1* | 1/2022 | Ladurini | G06N 20/00 |
| 2022/0032952 A1* | 2/2022 | Lienke | B60W 60/0011 |
| 2022/0048533 A1* | 2/2022 | Ödblom | G06F 11/3668 |
| 2022/0092804 A1* | 3/2022 | Chican | G06V 10/145 |
| 2022/0126858 A1* | 4/2022 | Liu | B60W 60/001 |
| 2022/0126864 A1* | 4/2022 | Moustafa | G06T 1/0007 |
| 2022/0187841 A1* | 6/2022 | Ebrahimi Afrouzi | |
| | | | G05D 1/0242 |
| 2022/0204007 A1* | 6/2022 | Tsuchiya | B60W 50/035 |
| 2022/0224442 A1* | 7/2022 | Srivastava | H04L 1/0083 |
| 2022/0227394 A1* | 7/2022 | Wray | B60W 30/0953 |
| 2022/0292888 A1* | 9/2022 | Reiter | G06F 11/3476 |
| 2022/0300361 A1* | 9/2022 | Rose | G06F 16/289 |
| 2022/0324484 A1* | 10/2022 | Hruschka | B60W 30/0956 |
| 2022/0362928 A1* | 11/2022 | Sharma | B25J 9/161 |
| 2023/0037367 A1* | 2/2023 | Qian | B60W 30/143 |
| 2023/0042431 A1* | 2/2023 | Ramamoorthy | G06F 17/18 |
| 2023/0100091 A1* | 3/2023 | Ishikawa | B60W 60/0011 |
| | | | 703/2 |
| 2023/0138650 A1* | 5/2023 | Zhao | G01M 17/007 |
| | | | 701/23 |
| 2023/0145208 A1* | 5/2023 | Bobu | G06N 20/00 |
| | | | 706/12 |
| 2023/0154195 A1* | 5/2023 | Agarwal | G06V 20/588 |
| | | | 382/103 |
| 2023/0222267 A1* | 7/2023 | Muehlenstaedt | G06V 20/56 |
| | | | 703/8 |
| 2023/0222268 A1* | 7/2023 | Muehlenstaedt | G05D 1/0217 |
| | | | 703/1 |
| 2023/0227069 A1* | 7/2023 | Donderici | G06V 10/774 |
| | | | 706/12 |
| 2023/0252084 A1* | 8/2023 | Kabzan | G05B 13/0265 |
| | | | 707/722 |
| 2023/0316772 A1* | 10/2023 | Hu | B60W 60/001 |
| | | | 382/104 |
| 2023/0322270 A1* | 10/2023 | Cui | B60W 30/0956 |
| 2023/0347933 A1* | 11/2023 | Stellet | B60W 60/0015 |
| 2023/0391356 A1* | 12/2023 | Jiang | G06V 20/582 |
| 2024/0005666 A1* | 1/2024 | Wang | B60W 60/001 |
| 2024/0010209 A1* | 1/2024 | Han | G06F 1/182 |
| 2024/0012106 A1* | 1/2024 | Fasola | G01S 13/931 |
| 2024/0067195 A1* | 2/2024 | Wray | G06N 7/01 |
| 2024/0169111 A1* | 5/2024 | Gribble | G06F 30/20 |
| 2024/0419979 A1* | 12/2024 | Karkus | G06N 7/01 |

* cited by examiner

700

```
┌─────────────────────────────────────────────────────────┐
│ RECEIVE A PLURALITY OF MESSAGES GENERATED BY A VEHICLE, │
│      EACH OF THE MESSAGES BEING ASSOCIATED              │
│              WITH AN INDICATED TOPIC                    │
│                                                     705 │
└─────────────────────────────────────────────────────────┘
                            │
                            ▼
┌─────────────────────────────────────────────────────────┐
│ INITIALIZE ONE OR MORE STATE MACHINES, EACH STATE       │
│ MACHINE PRECONFIGURED WITH A PLURALITY OF SPECIFIED     │
│   STATE PARAMETERS TO DEFINE A SPECIFIC SCENARIO        │
│          FOR EACH RESPECTIVE STATE MACHINE              │
│                                                     710 │
└─────────────────────────────────────────────────────────┘
                            │
                            ▼
┌─────────────────────────────────────────────────────────┐
│     QUERY THE PLURALITY OF MESSAGES BY THE STATE        │
│    MACHINES, EACH STATE MACHINE QUERYING FOR            │
│       CERTAIN MESSAGES HAVING PARTICULAR                │
│              ASSOCIATED INDICATED TOPIC                 │
│                                                     715 │
└─────────────────────────────────────────────────────────┘
                            │
                            ▼
┌─────────────────────────────────────────────────────────┐
│ UPDATE, AT EACH OF A SEQUENCE OF TIME INTERVALS         │
│ OF A TIME PERIOD, THE ONE OR MORE STATE MACHINES        │
│ BASED ON STATE TRANSITIONS DETERMINED FOR EACH          │
│ RESPECTIVE STATE MACHINE AT EACH TIME INTERVAL          │
│                                                     720 │
└─────────────────────────────────────────────────────────┘
                            │
                            ▼
┌─────────────────────────────────────────────────────────┐
│   UPDATE A SCENARIO RECORD BASED ON EACH OF THE         │
│        UPDATED ONE OR MORE STATE MACHINES               │
│                                                     725 │
└─────────────────────────────────────────────────────────┘
                            │
                            ▼
┌─────────────────────────────────────────────────────────┐
│    STORE THE UPDATED SCENARIO RECORD IN A DATA STORE    │
│                                                     730 │
└─────────────────────────────────────────────────────────┘
```

*FIG. 7*

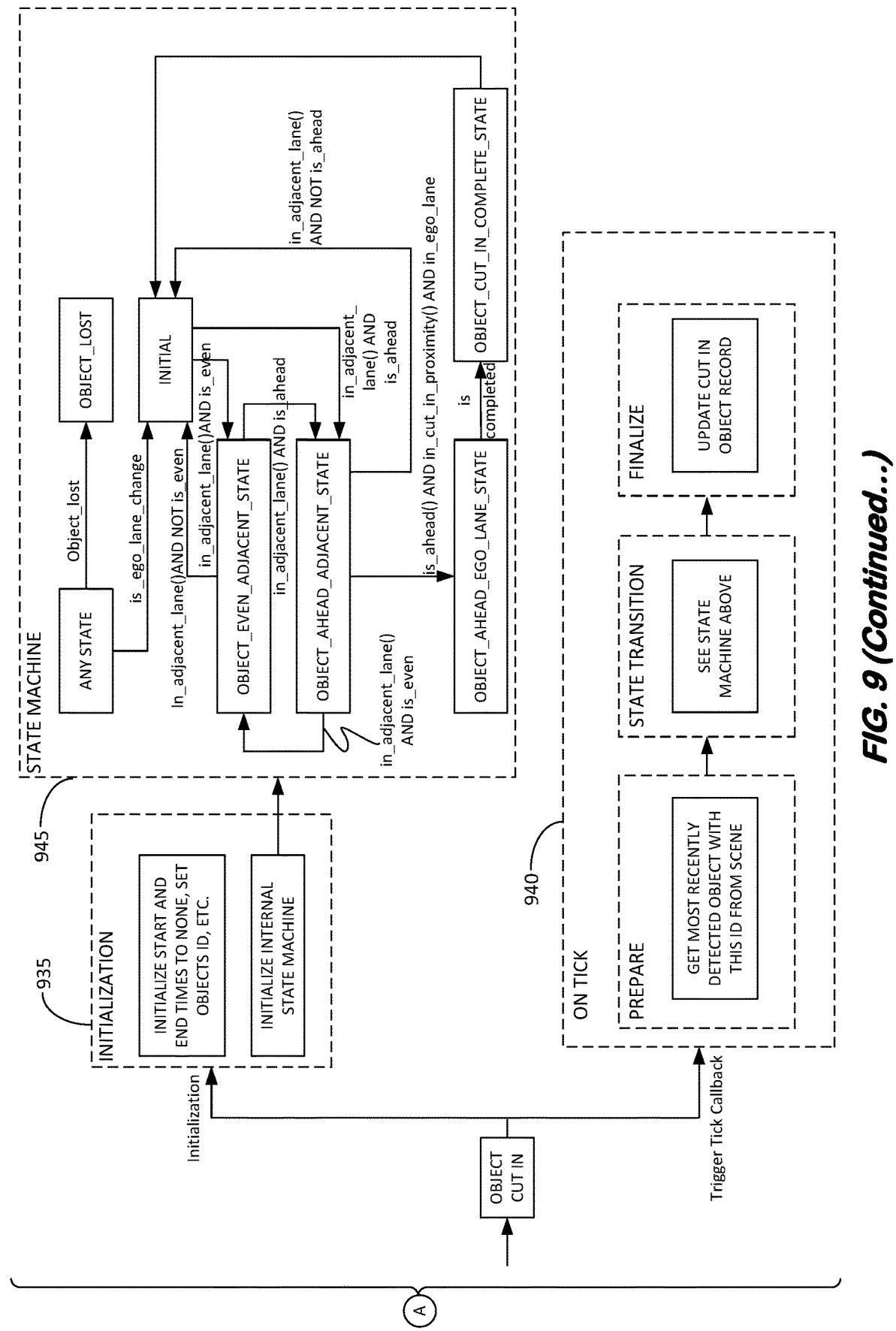
FIG. 9 (Continued...)

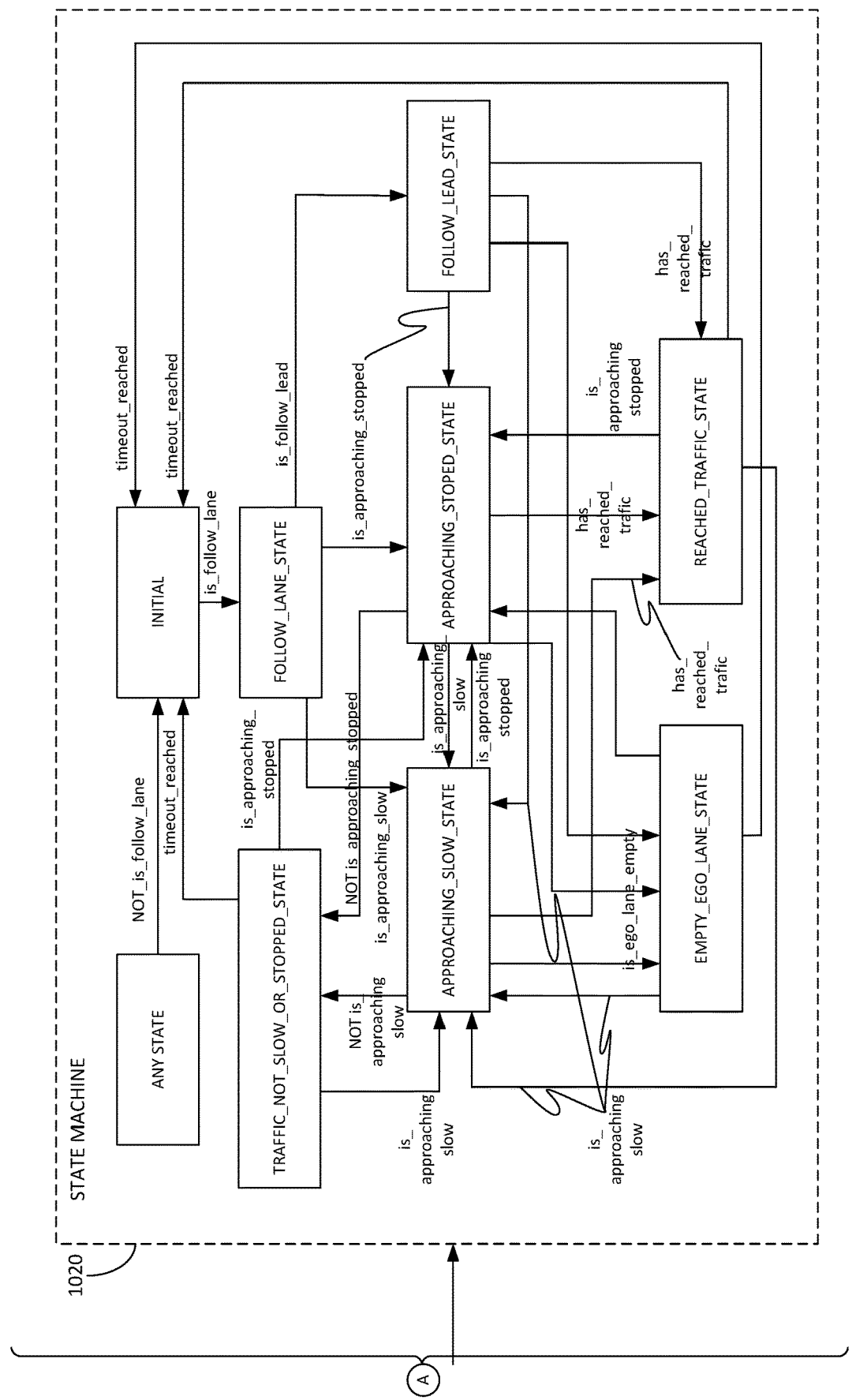
FIG. 10 (Continued...)

AUTONOMOUS VEHICLE AUTOMATED SCENARIO CHARACTERIZATION

BACKGROUND

Autonomous and semi-autonomous vehicles (e.g., self-driving vehicles) include sensors, devices, and systems that may function together to generate sensor data indicative of various parameter values related to the position, speed, and operating characteristics of the vehicle. Additionally, sensors and systems on the vehicle might also generate data related to the position, speed, and other aspects of other vehicles and objects in the vicinity of the vehicle, including, for example, lane lines and road topography.

Despite the vast amounts of sensor data that might be generated and recorded by a vehicle, the discrete information collected by the vehicle may provide a limited perspective of the behavior of the vehicle over an extended period of time since the sensor data might typically report parameter values collected at discrete times. An analysis of discrete timestamped data in isolation might limit the context and understanding of an overall behavior of the vehicle over any appreciable amount of time. For example, a six hour "run" of a truck on a transport route, including a variety traffic patterns and conditions may present a challenge regarding any understanding or overall characterization of the behavior of the truck over the entire run based on an analysis of the raw, timestamped data from multiple sensors since there is no contextual understanding of what portions and what sensors need to be analyzed for significant events that occur during the run.

As such, there exists a need for a system and method to provide accurate and reliable characterization of an autonomous vehicle's behavior and the behavior of other vehicles in a vicinity of the vehicle, including a variety and plurality of events over an extended period of time.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 7 is an illustrative flow diagram of a process, in accordance with an example embodiment;

Figure 1:
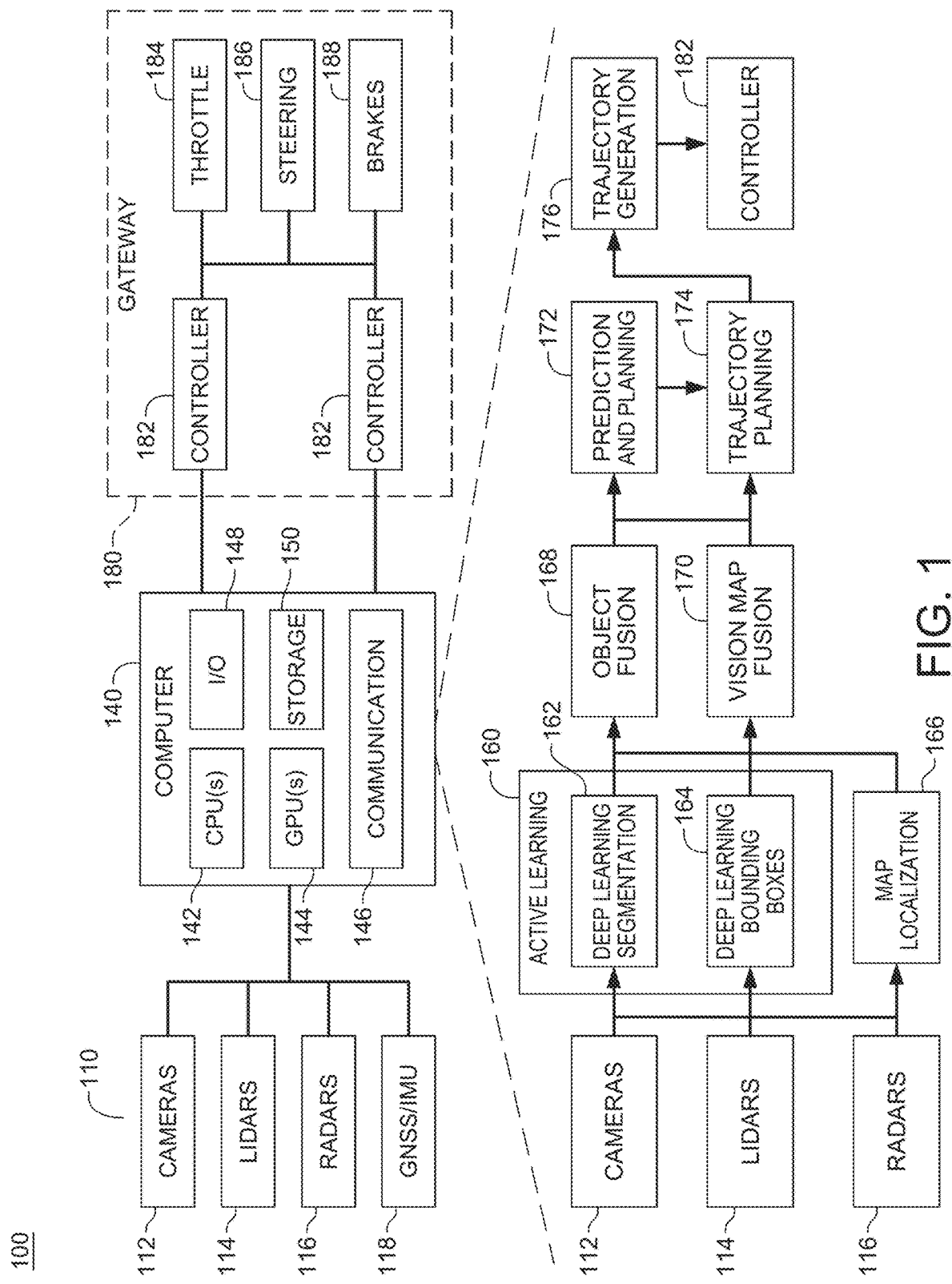
FIG. 1 is an illustrative block diagram of a control system that may be deployed in a vehicle, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the one or more principles defined herein may be applied to other embodiments and applications without departing from the spirit and scope of the present disclosure. Moreover, in the following description, numerous details are set forth for the purpose of explanation. However, one of ordinary skill in the art should understand that embodiments may be practiced without the use of these specific details. In other instances, well-known structures, methods, procedures, components, and circuits are not shown or described so as not to obscure the description with unnecessary detail. Thus, the present disclosure is not intended to be limited to the embodiments shown but is to be accorded the widest scope consistent with the principles and features disclosed herein.

Figure 2A:
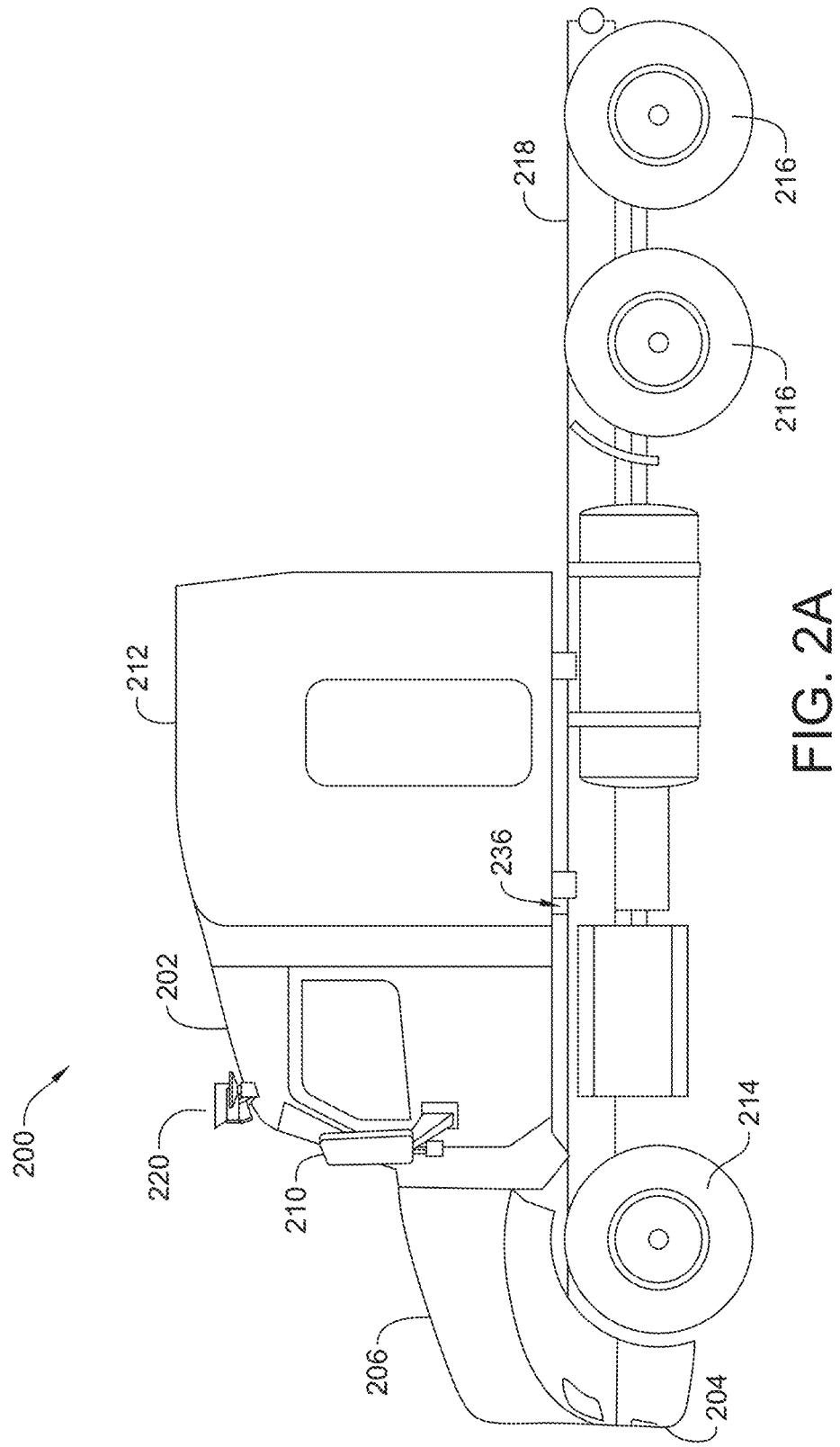
FIGS. 2A-2C are illustrative depictions of exterior views of a semi-truck, in accordance with example embodiments.
Figure 2B:
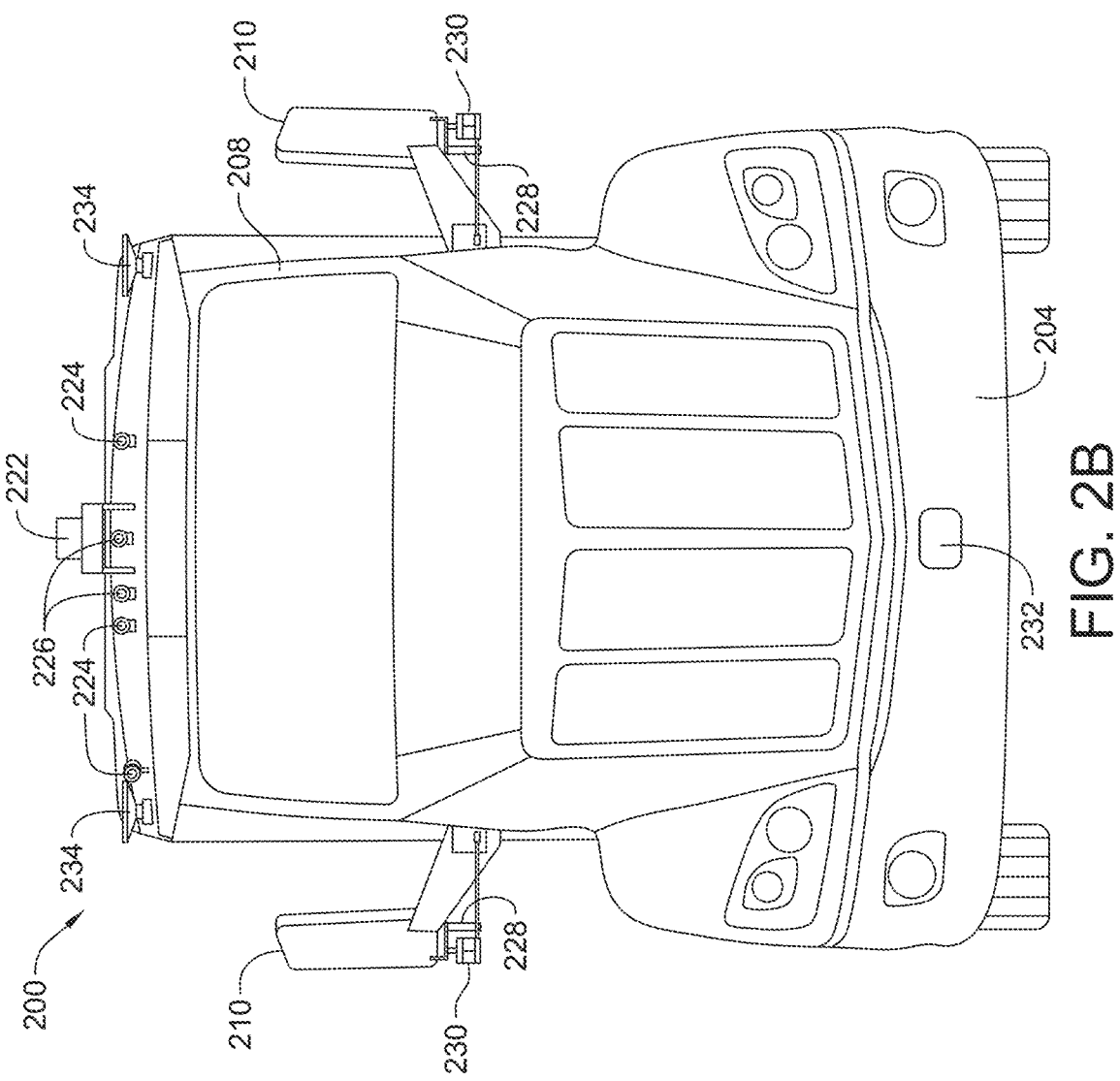
Figure 2C:
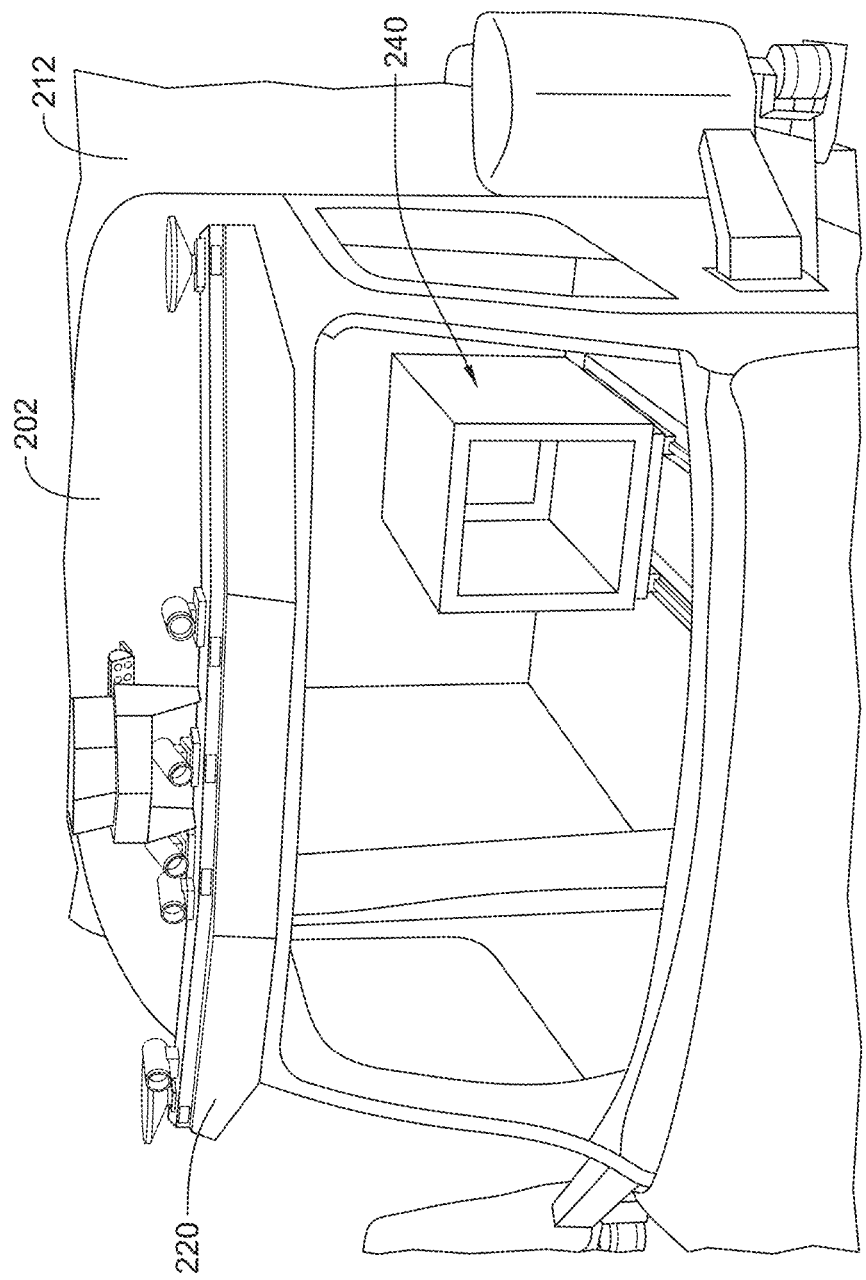

FIG. 1 illustrates a control system 100 that may be deployed in a vehicle such as, for example though not limited to, a semi-truck 200 depicted in FIGS. 2A-2C, in accordance with an example embodiment. Referring to FIG. 1, the control system 100 may include sensors 110 that collect data and information provided to a central computer system 140 to perform operations including, for example, control operations that control components of the vehicle via a gateway 180. Pursuant to some embodiments, gateway 180 is configured to allow the central computer system 140 to control different components from different manufacturers.

Central computer system 140 may be configured with one or more central processing units (CPUs) 142 to perform processing, including processing to implement features of embodiments of the present invention as described elsewhere herein, as well as to receive sensor data from sensors 110 for use in generating control signals to control one or more actuators or other controllers associated with systems of the vehicle in which control system 100 is deployed (e.g., actuators or controllers allowing control of a throttle 184, steering systems 186, brakes 188 and/or other devices and systems). In general, control system 100 may be configured to operate the vehicle (e.g., semi-truck 200) in an autonomous (or semi-autonomous) mode of operation.

For example, control system 100 may be operated to capture images from one or more cameras 112 mounted at various locations of semi-truck 200 and perform processing (e.g., image processing) on those captured images to identify objects proximate to or in a path of the semi-truck 200. In some aspects, one or more lidars 114 and radar 116 sensors may be positioned on the vehicle to sense or detect the presence and volume of objects proximate to or in the path of the semi-truck 200. Other sensors may also be positioned or mounted at various locations of the semi-truck 200 to capture other information such as position data. For example, the sensors might include one or more satellite positioning sensors and/or inertial navigation systems such as GNSS/IMU 118. A Global Navigation Satellite System (GNSS) is a space-based system of satellites that provides the location information (longitude, latitude, altitude) and time information in all weather conditions, anywhere on or near the Earth to devices called GNSS receivers. GPS is the world's most used GNSS system and may be used interchangeably with GNSS herein. An inertial measurement unit ("IMU") is an inertial navigation system. In general, an inertial navigation system ("INS") measures and integrates orientation, position, velocities, and accelerations of a moving object. An INS integrates the measured data, where a GNSS is used as a correction to the integration error of the INS orientation calculation. Any number of different types of GNSS/IMU 118 sensors may be used in conjunction with features of the present invention.

The data collected by each of the sensors 110 may be processed by computer system 140 to generate control signals that might be used to control an operation of the semi-truck 200. For example, images and location information may be processed to identify or detect objects around or in the path of the semi-truck 200 and control signals may be transmitted to adjust throttle 184, steering 186, and/or brakes 188 via controller(s) 182, as needed to safely operate the semi-truck 200 in an autonomous or semi-autonomous manner. Note that while illustrative example sensors, actuators, and other vehicle systems and devices are shown in FIG. 1, those skilled in the art, upon reading the present disclosure, will appreciate that other sensors, actuators, and systems may also be included in system 100 consistent with the present disclosure. For example, in some embodiments, actuators that provide a mechanism to allow control of a transmission of a vehicle (e.g., semi-truck 200) may also be provided.

Control system 100 may include a computer system 140 (e.g., a computer server) that is configured to provide a computing environment in which one or more software, firmware, and control applications (e.g., items 160-182) may be executed to perform at least some of the processing described herein. In some embodiments, computer system 140 includes components that are deployed on a vehicle (e.g., deployed in a systems rack 240 positioned within a sleeper compartment 212 of the semi-truck as shown in FIG. 2C). Computer system 140 may be in communication with other computer systems (not shown) that might be local to and/or remote from the semi-truck 200 (e.g., computer system 140 might communicate with one or more remote terrestrial or cloud-based computer system via a wireless communication network connection).

According to various embodiments described herein, computer system 140 may be implemented as a server. In some embodiments, computer system 140 may be configured using any of a number of computing systems, environments, and/or configurations such as, but not limited to, personal computer systems, cloud platforms, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like.

Different software applications or components might be executed by computer system 140 and control system 100. For example, as shown at active learning component 160, applications may be provided that perform active learning machine processing to process images captured by one or more cameras 112 and information obtained by lidars 114. For example, image data may be processed using deep learning segmentation models 162 to identify objects of interest in the captured images (e.g., other vehicles, construction signs, etc.). In some aspects herein, deep learning segmentation may be used to identify lane points within the lidar scan. As an example, the system may use an intensity-based voxel filter to identify lane points within the lidar scan. Lidar data may be processed by machine learning applications 164 to draw or identify bounding boxes on image data to identify objects of interest located by the lidar sensors.

Information output from the machine learning applications may be provided as inputs to object fusion 168 and vision map fusion 170 software components that may perform processing to predict the actions of other road users and to fuse local vehicle poses with global map geometry in real-time, enabling on-the-fly map corrections. The outputs from the machine learning applications may be supplemented with information from radars 116 and map localization 166 application data (as well as with positioning data). In some aspects, these applications allow control system 100 to be less map reliant and more capable of handling a constantly changing road environment. Further, by correcting any map errors on-the-fly, control system 100 may facilitate safer, more scalable and more efficient operations as compared to alternative map-centric approaches.

Information is provided to prediction and planning application 172 that provides input to trajectory planning 174 components allowing a trajectory to be generated by trajectory generation system 176 in real time based on interactions and predicted interactions between the semi-truck 200 and other relevant vehicles in the trucks operating environment. In some embodiments, for example, control system 100 generates a sixty second planning horizon, analyzing relevant actors and available trajectories. The plan that best fits multiple criteria (including safety, comfort and route preferences) may be selected and any relevant control inputs needed to implement the plan are provided to controller(s) 182 to control the movement of the semi-truck 200.

In some embodiments, these disclosed applications or components (as well as other components or flows described herein) may be implemented in hardware, in a computer program executed by a processor, in firmware, or in a combination of the above, unless otherwise specified. In some instances, a computer program may be embodied on a computer readable medium, such as a storage medium or storage device. For example, a computer program, code, or instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of non-transitory storage medium known in the art.

A non-transitory storage medium may be coupled to a processor such that the processor may read information from, and write information to, the storage medium. In an alternative, the storage medium may be integral to the processor. The processor and the storage medium may reside in an application specific integrated circuit ("ASIC"). In an alternative embodiment, the processor and the storage medium may reside as discrete components. For example, FIG. 1 illustrates an example computer system 140 that may represent or be integrated in any of the components disclosed hereinbelow, etc. As such, FIG. 1 is not intended to suggest any limitation as to the scope of use or functionality of embodiments of a system and method (e.g., a sensor trigger hub) disclosed herein.

Computer system 140 may be described in the general context of computer system-executable instructions, such as program modules, being executed by a computer system. Generally, program modules may include routines, programs, objects, components, logic, data structures, and so on that perform particular tasks or implement particular abstract data types. Computer system 140 may be implemented in distributed cloud computing environments where tasks are performed by remote processing devices that are linked through a communications network. In a distributed cloud computing environment, program modules may be located in both local and remote computer system storage media including non-transitory memory storage devices.

Referring to FIG. 1, computer system 140 is shown in the form of a general-purpose computing device. The components of the computer system 140 may include, but are not limited to, one or more processors (e.g., CPUs 142 and GPUs 144), a communication interface 146, one or more input/output interfaces 148, and one or more storage devices 150. Although not shown, computer system 140 may also include a system bus that couples various system components, including system memory, to CPUs 142. In some embodiments, input/output (I/O) interfaces 148 may also include a network interface. For example, in some embodiments, some or all of the components of the control system 100 may be in communication via a controller area network ("CAN") bus or the like interconnecting the various components inside of the vehicle in which control system 100 is deployed and associated with.

In some embodiments, storage device 150 may include a variety of types and forms of non-transitory computer readable media. Such media may be any available media that is accessible by computer system/server, and it may include both volatile and non-volatile media, removable and non-removable media. System memory, in one embodiment, implements the processes represented by the flow diagram(s) of the other figures herein. The system memory can include computer system readable media in the form of volatile memory, such as random access memory (RAM) and/or cache memory. As another example, storage device 150 can read and write to a non-removable, non-volatile magnetic media (not shown and typically called a "hard drive"). Although not shown, the storage device 150 may include one or more removable non-volatile disk drives such as magnetic, tape or optical disk drives. In such instances, each can be connected to the bus by one or more data media interfaces. Storage device 150 may include at least one program product having a set (e.g., at least one) of program modules, code, and/or instructions that are configured to carry out the functions of various embodiments of the application.

FIGS. 2A-2C are illustrative depictions of exterior views of a semi-truck 200 that may be associated with or used in accordance with example embodiments. Semi-truck 200 is shown for illustrative purposes only. As such, those skilled in the art, upon reading the present disclosure, will appreciate that embodiments may be used in conjunction with a number of different types of vehicles and are not limited to a vehicle of the type illustrated in FIGS. 2A-2C. The example semi-truck 200 shown in FIGS. 2A-2C is one style of truck configuration that is common in North American that includes an engine 206 forward of a cab 202, a steering axle 214, and two drive axles 216. A trailer (not shown) may typically be attached to semi-truck 200 via a fifth-wheel trailer coupling that is provided on a frame 218 and positioned over drive axles 216. A sleeper compartment 212 may be positioned behind cab 202, as shown in 2A and 2C. FIGS. 2A-2C further illustrate a number of sensors that are positioned at different locations of semi-truck 200. For example, one or more sensors may be mounted on a roof of cab 202 on a sensor rack 220. Sensors may also be mounted on side mirrors 210, as well as other locations of the semi-truck. Sensors may be mounted on a bumper 204, as well as on the side of the cab 202 and other locations. For example, a rear facing radar 236 is shown as being mounted on a side of the cab 202 in FIG. 2A. Embodiments may be used with other configurations of trucks and other vehicles (e.g., such as semi-trucks having a cab over or cab forward configuration or the like). In general, and without limiting embodiments of the present disclosure, features of the present invention may be used with desirable results in vehicles that carry cargo over long distances, such as long-haul semi-truck routes.

FIG. 2B is a front view of the semi-truck 200 and illustrates a number of sensors and sensor locations. The sensor rack 220 may secure and position several sensors above windshield 208 including a long range lidar 222, long range cameras 224, GPS antennas 234, and mid-range front facing cameras 226. Side mirrors 210 may provide mounting locations for rear-facing cameras 228 and mid-range lidar 230. A front radar 232 may be mounted on bumper 204. Other sensors (including those shown and some not shown) may be mounted or installed on other locations of semi-truck 200. As such, the locations and mounts depicted in FIGS. 2A-2C are for illustrative purposes only.

Referring now to FIG. 2C, a partial view of semi-truck 200 is shown that depicts some aspects of an interior of cab 202 and the sleeper compartment 212. In some embodiments, portion(s) of control system 100 of FIG. 1 might be deployed in a systems rack 240 in the sleeper compartment 212, allowing easy access to components of the control system 100 for maintenance and operation.

Figure 3:
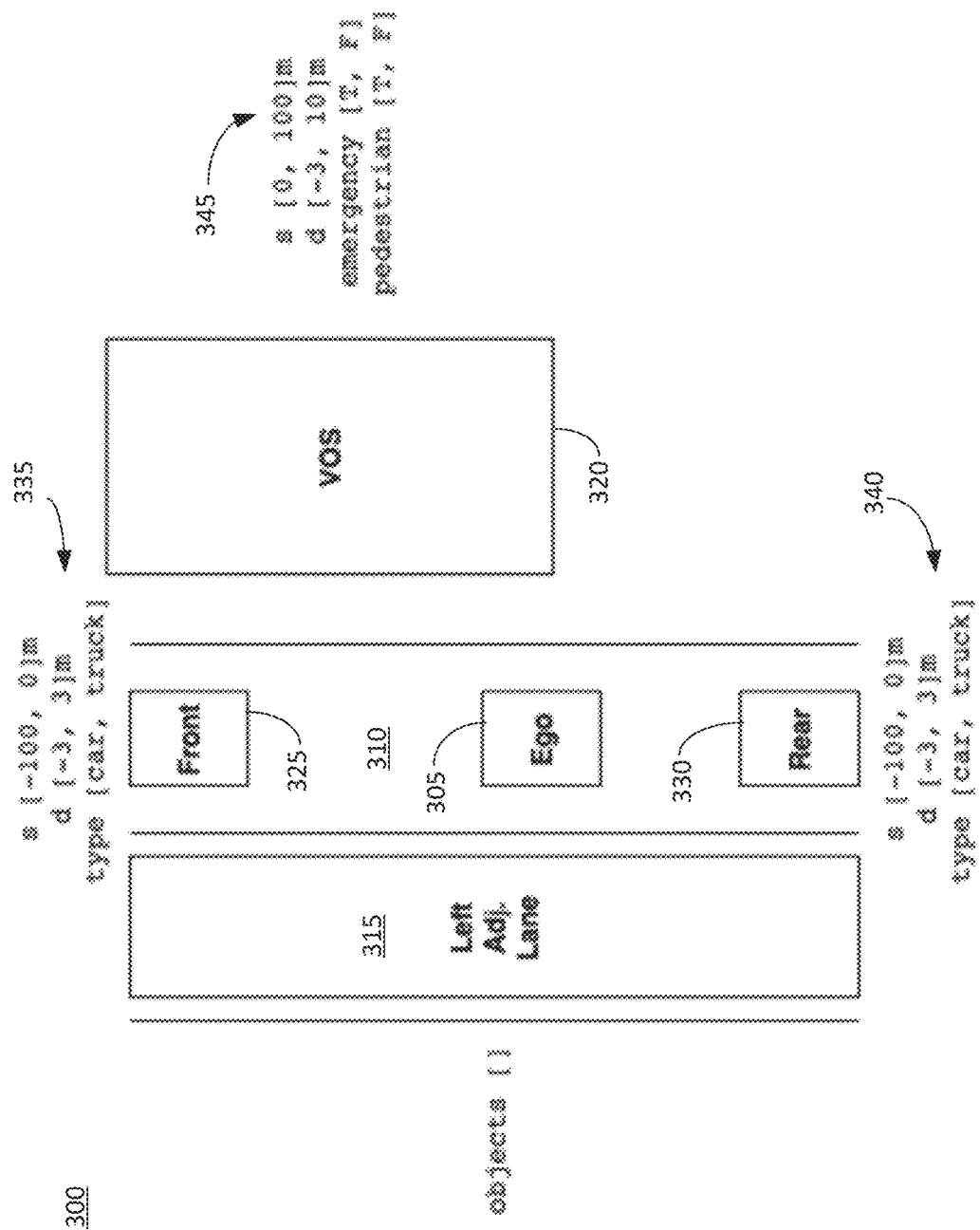
FIG. 3 is an illustrative depiction of a scenario definition, in accordance with an example embodiment.

FIG. 3 is an illustrative depiction of a scenario definition, in accordance with an example embodiment. As used herein, a scenario refers to a sequence or collection of events that may occur in series, simultaneously or with some predetermined relationship related to an autonomous vehicle that describes a driving situation. In some embodiments, a scenario may include a subject (i.e., ego) autonomous vehicle, the environment (e.g., lanes, other objects and actors in the vicinity of the subject vehicle, etc.), and information regarding the sequence of events (e.g., sensor data from the ego vehicle, annotations from an ego vehicle driver, start and/or stop times of events, etc.). In the example scenario definition (or model) 300 of FIG. 3, an ego vehicle 305 is shown in lane 310, where object(s) may be located in front of the ego vehicle at 325 and object(s) might be located to the rear of the ego vehicle at 330. Example scenario definition 300 further shows a left adjacent lane 315 in which there might be objects, including other vehicles, and a shoulder region to the right of lane 310 where a VOS (vehicle on shoulder) 320 might be located. The example scenario definition depicted in FIG. 3 might be defined to include additional or fewer lanes and/or objects, depending on an actual or anticipated operating environment for the ego vehicle. Scenario definition 310 may include and specify parameters to fully define a scenario. In FIG. 3, parameters, including parameter sets 335, 340, and 345, are specified for different objects in the scenario definition, including a front vehicle, a rear vehicle, and VOS. As shown, the scenario may specify a range of possible values for one or more of the parameters defined thereby.

In some aspects, a scenario definition may be generated to include preconfigured parameters for the particular scenario it defines. In some aspects, scenarios herein may include an approaching traffic scenario, a cut in scenario, a forced merge scenario, an automated lane change scenario, a manual lane change scenario, a vehicle on shoulder scenario, and other scenarios that might be encountered and/or of interest for an autonomous vehicle. In some aspects, the present disclosure provides a framework for characterizing scenarios related to an autonomous vehicle, including scenarios now known and those that might become known, without limit to specific examples herein. The different scenarios may be referenced by a scenario type, where the scenario type is a label associated with a family of scenarios that all represent a common behavior. In some aspects, a scenario type is a top level indicator of a specific behavior for a vehicle.

Figure 4:
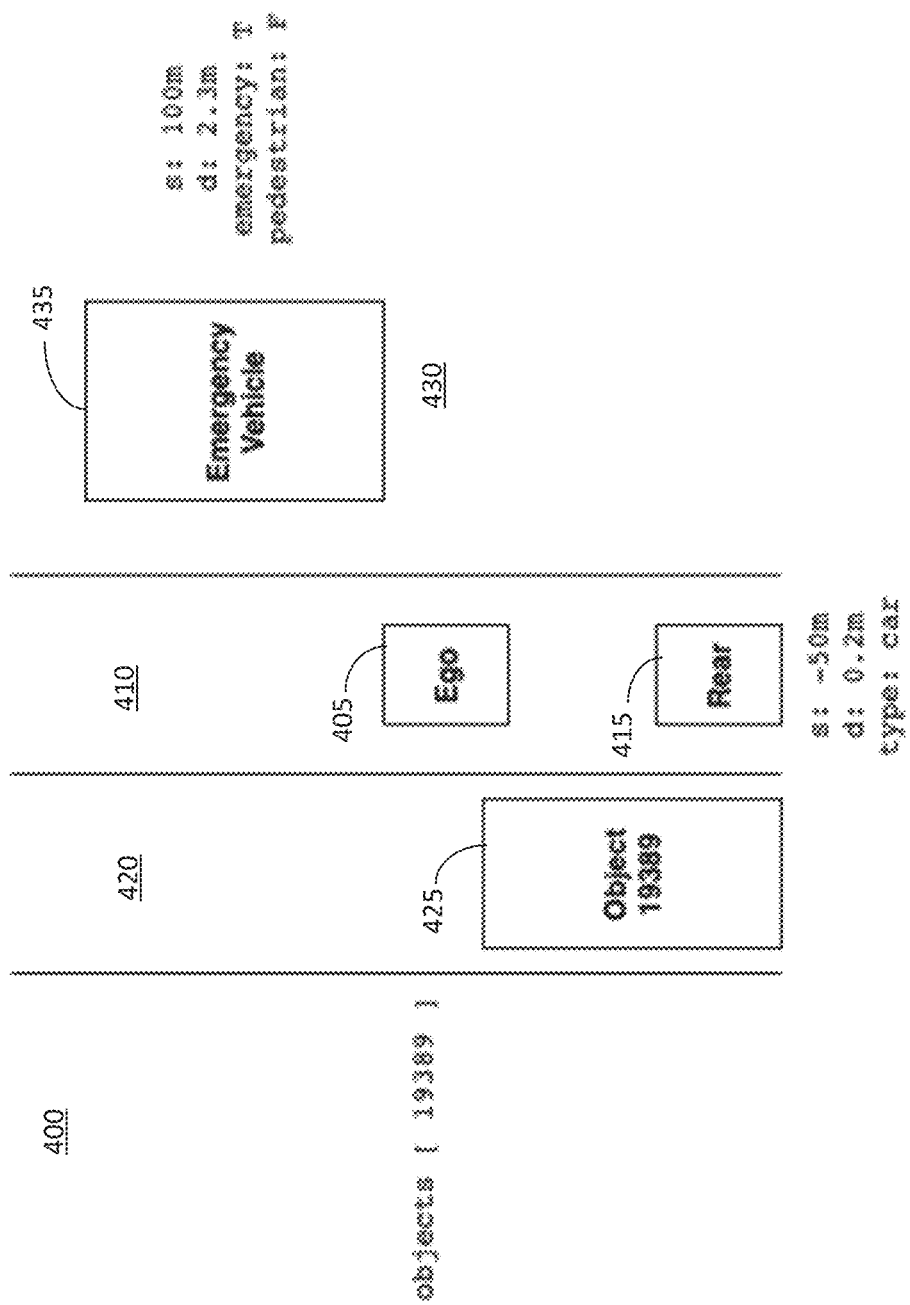
FIG. 4 is an illustrative depiction of a concrete instance of a scenario, in accordance with an example embodiment.

FIG. 4 is an illustrative depiction of a concrete scenario 400 (i.e., an instance of a scenario definition), in accordance with an example embodiment. Concrete scenario 400 may be a specific configuration or instance of a scenario definition. In some aspects, the existence of each actor and object specified in a scenario definition, and the corresponding values for the parameters specified for each of the actors and objects, may be determined from a data record, file, or tangible, non-transitory data stream representing an operational run of a vehicle. In some aspects, the data representing an operational run of a vehicle includes pertinent events that occur on the road during the operational run (i.e., over a period of time from a start of the run to an end of the run) by the vehicle. An instance of a concrete scenario might not include all of the actors and objects specified in a particular scenario definition since, for example, all of the actors and objects specified in the scenario definition might not exist in an actual run or portions thereof. The concrete scenario 400 depicted in FIG. 4 includes an ego vehicle 405 in lane 410 and a vehicle 415 to the rear of the ego vehicle, where values are indicated for the rear vehicle. Concrete scenario 400 does not include a vehicle in front of ego vehicle 410 since no vehicle was actually seen on the road in front of the ego vehicle by the onboard sensor and system of the vehicle at the time represented by concrete scenario 400. The example of FIG. 4 includes an object 425 (object id: 19389) in left lane 420 and an emergency vehicle 435 in shoulder area 430, where parameters values are specified for object 19389 and the emergency vehicle.

In some aspects, parameter values may be determined by one or more sensors, devices, and processors on an autonomous vehicle. For example, object identification, tracking, and labelling might be performed by one or more sensors, devices, and processors on-board the vehicle. That is, in some embodiments, the one or more sensors might be a source of information for the parameter values. In some embodiments, annotations provided by an ego vehicle driver (e.g., in a driver assisted configuration) might be a source of information for some of the parameter values. The annotations might be used to complement or instead of information from the one or more sensors, devices, and processors (e.g., the sensor data is lost, corrupted, not present at a particular time, etc.).

Some embodiments herein relate to systems and methods of scenario characterization. That is, some embodiments herein relate to an aggregation of distinctive features or characteristics of a concrete scenario that occurred on the road during an operational run of an autonomous vehicle. In some embodiments, a scenario characterization method and system herein might generate an output including scenario record, where the scenario record is a data structure storing information as specified in a scenario definition (e.g., pertinent actors and objects, and their respective parameter values). In some embodiments, metadata related to a concrete scenario may also be included in a scenario record. Examples of metadata that might be stored with or in a scenario record includes, but is not limited to, a start time and/or a stop time for an event, annotations from an ego vehicle driver, etc. In some embodiments, an internal state of a state machine associated with the particular scenario type of the scenario record is included in the scenario record. As will be disclosed below, some embodiments herein relate to scenario characterization based on state machines.

Figure 5:
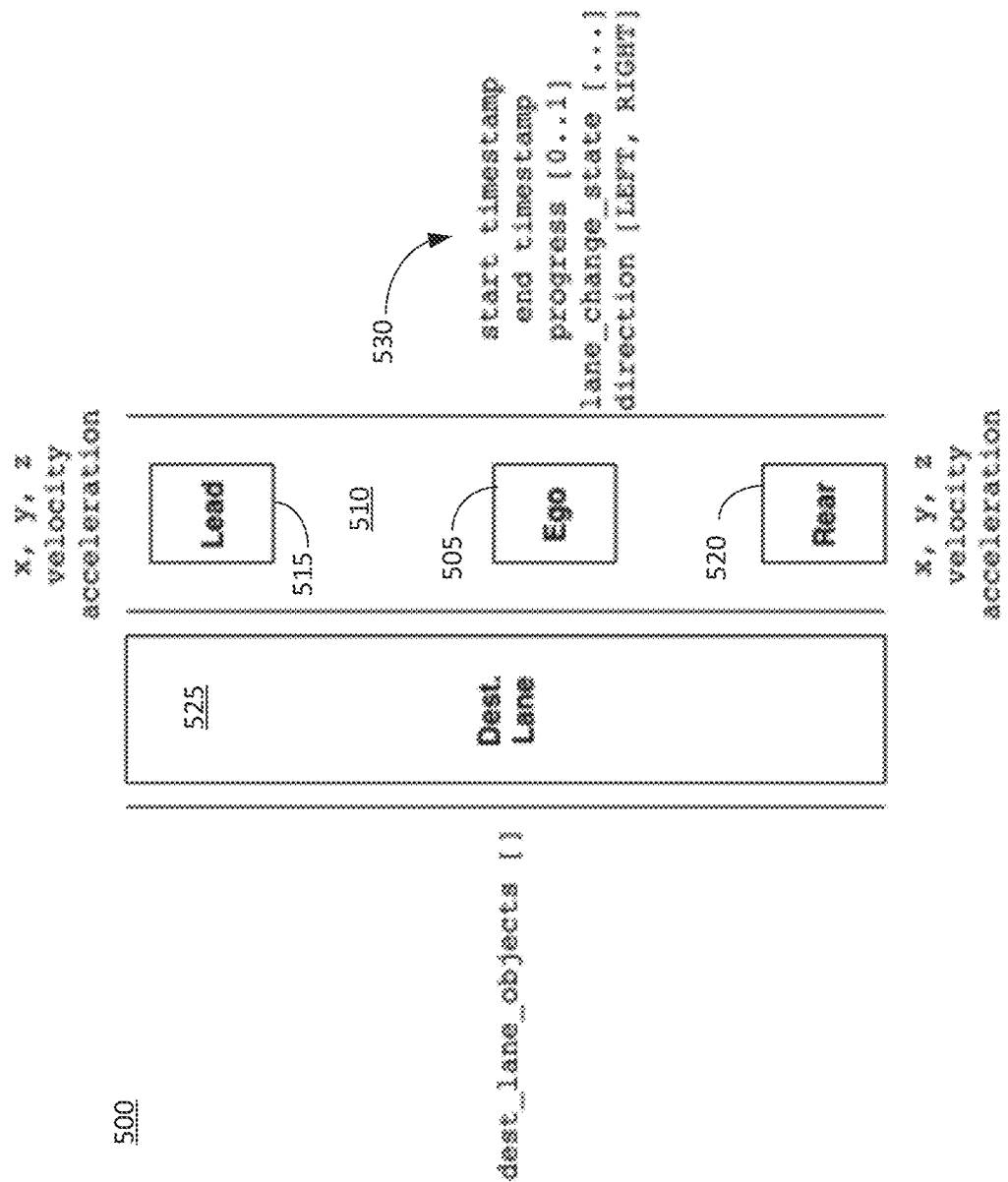
FIG. 5 is an illustrative depiction of a scenario record, in accordance with an example embodiment.

FIG. 5 is an illustrative depiction of a scenario record 500, in accordance with an example embodiment. Scenario record 500 includes an ego vehicle 505 in lane 510 and a destination lane 525, where scenario record 500 is associated with a lane change scenario type (i.e., ego vehicle 505 will be changing lanes from its current lane 510 to a destination lane 525). As shown, scenario record 500 includes parameters for a lead vehicle 515 and a rear vehicle 520 specific values not shown in FIG. 5). Additionally, metadata 530 pertinent to the lane change scenario is included in scenario record 500. For the lane change scenario represented by scenario record 500, the example record includes metadata (specific values not shown in FIG. 5) for a start time and stop time of the lane change, a progress of the lane change, a lane change state, and a direction of the lane change. Other parameters and/or metadata might be included in scenario records for other scenario types since, for example, the parameters and states defining other scenario types, as well as the pertinent metadata related thereto, might differ from the example of FIG. 5.

Figure 6:
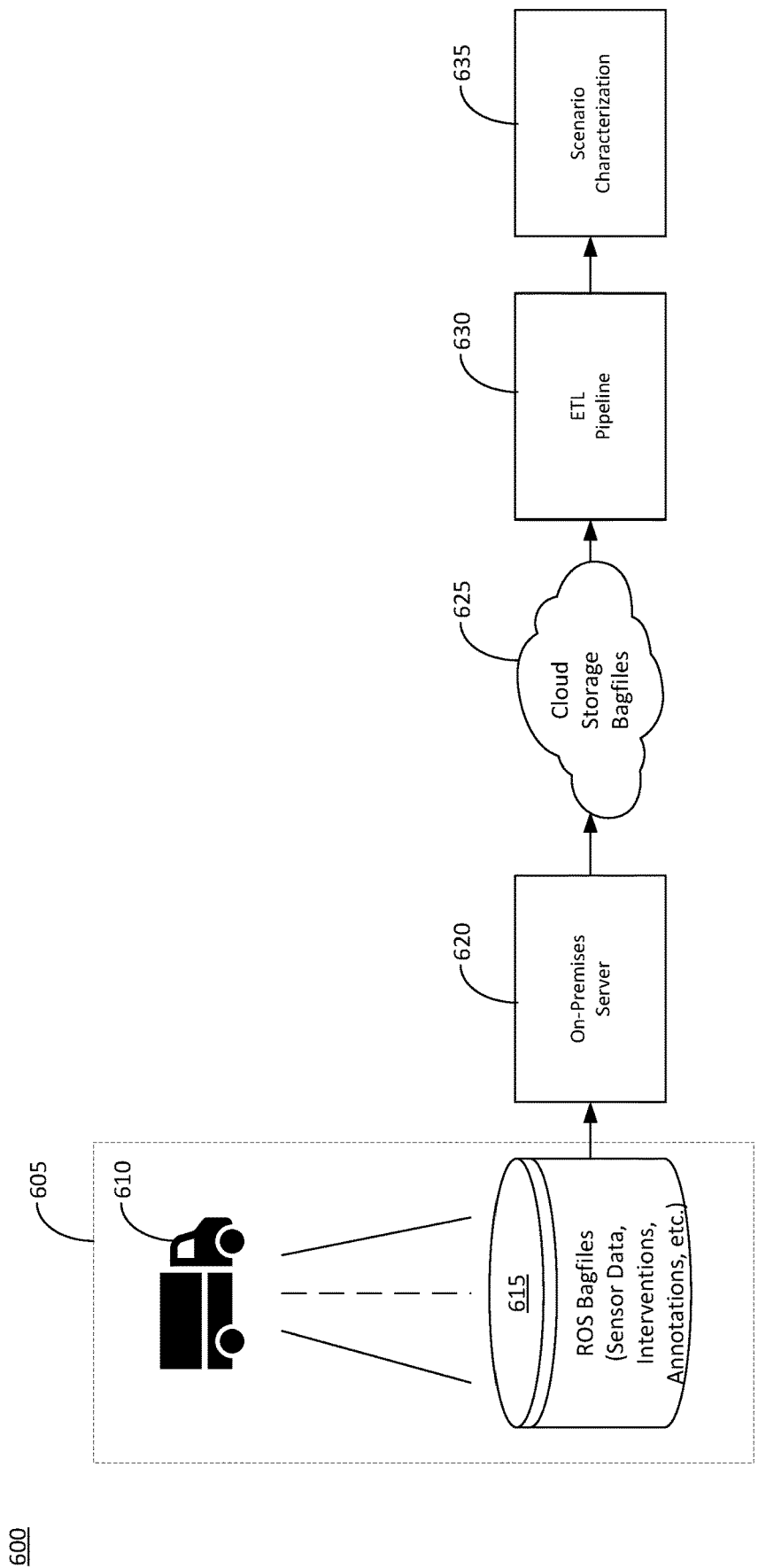
FIG. 6 is a block diagram of an overall process flow related to scenario characterization, in accordance with an example embodiment.

FIG. 6 is an illustrative block diagram of an overall process flow 600 related to scenario characterization, in accordance with an example embodiment. At 605, data 615 is collected or otherwise assembled during an operational run of vehicle 610. In some embodiments, vehicle 610 may include a truck as discussed herein regarding FIGS. 1-2C, or at least some aspects of such a truck. The data 615 collected and stored onboard vehicle 610 might include, for example, sensor data, vehicle driver interventions, annotations, tags, etc. In some embodiments, the data collected and stored on vehicle 610 might be configured as ROS bagfiles compatible with the ROS™ (Robot Operating System) by Open Robotics. Other data file configurations and structures might be used in other embodiments.

Subsequent to the conclusion of the operational run of truck 610 during which data 615 was recorded, the data is offloaded from the truck. In some embodiments, the data may be offloaded from the truck to an on-premises server or system 620. In some embodiments the data might be uploaded to a cloud-hosted storage system 625, where cloud-hosted storage system 625 provides, for example, efficient, secure, scalable, and cost-effective data storage. Continuing with the process flow of FIG. 6, the uploaded data may be processed through an ETL (extract, transform, and load) pipeline 630 that operates to extract the requisite portions of data from the uploaded data that is relevant for a scenario characterization processor 635, (pre-) processes the data into a format suitable and/or expected by the scenario characterization processor 635, and stores the transformed data in a database (or other data store) accessible by the scenario characterization processor 635. In some embodiments, ETL pipeline 630 might output files configured as JSON Line files (JSONl) where each line of the file may be parsed without having to parse the entire file. In some embodiments, ETL pipeline 630 may process and output data in a configuration applicable for use by processors other than scenario characterization processor 635.

In some embodiments, ETL pipeline 630 reads in the files (e.g., ROS bagfiles) that were recorded on truck 610, filters the messages based on a specified list of topics (i.e., scenario types), and further writes out the filtered messages (e.g., formatted as JSONL files) that are stored for further processing by scenario characterization processor 635. It is understood that these embodiments are not limiting and messages may include other forms and formats capable of being generated and conveying a topic.

Scenario characterization processor 635 receives the data output of the ETL pipeline and operates to, for example, aggregate the distinctive features and characterizations of different, specific scenarios that occurred during the operational run of the truck as represented in the input to the scenario characterization processor 635. In some aspects, scenario characterization processor 635 might be implemented by a plurality of state machines, where each state machine is preconfigured to define a specific scenario type. In some aspects, a state machine as used herein is a behavior model that may comprise a finite number of states, transitions, and actions. The state machine performs state transitions and produces outputs based on a current state and a given input. As used herein, a "state" is a situation or status of a system depending on previous inputs and causes a reaction on following inputs and a "state transition" defines for which input a state is changed from one to another. A state machine herein may be implemented by a device including a combination of hardware and software configured to store the "states" of an entity at a given time. In some aspects, each state machine may specify a plurality of state parameters that defines its associated scenario type. For example, a state machine may be preconfigured to implement a lane change scenario type, as illustrated in FIG. 4. Scenario characterization processor 635 receives the data and parses out the relevant messages based on a "topic" associated with each message, where the messages are each published to a specific topic.

In some aspects, a scenario characterization processor pipeline herein ingests or consumes the JSONl file messages, establishes a timer that it uses to tick through the received file messages at defined increments, and starts a number of different state machines. In some embodiments, the time increments may be 0.1 seconds, although this time interval may be defined differently for different embodiments and/or applications. The state machines are built (i.e., preconfigured) for each scenario type (or abstract use case). At each tick (e.g., by a central controller authority), each state machine is updated. That is, at every 0.1 second tick each state machine receives the information and determines their state transition(s) from their current state to the state reported in the newly received information. In some embodiments, the state machines have a particular ordering, wherein one or more state machines are updated before other state machines. For example, in some embodiments a lane reporter state machine is a pre-requisite to a forced merged state machine.

In some aspects, state machines herein may be configured to include a plurality of different states. In this manner, systems and methods herein may be able to provide not only an indication of whether a particular state occurred (e.g., Did the truck complete a lane change?), but also provide an indication of the lane change scenario at different stages of the lane change behavior, as determined from the data processed by the lane change state machine at each "tick" in time of an operational run. As an example, a simplified cut in scenario might be defined by (1) an object being in an adjacent lane, and (2) that object cutting over into our lane ahead of us, where this simplified version of a cut in scenario represents two distinct states (i.e., portions or segments) for what is occurring in this sequence of events related with a cut in type of scenario.

FIG. 7 is an illustrative flow diagram of a process 700, in accordance with an example embodiment. At operation 705, a plurality of messages generated by a vehicle are received by a scenario characterization processor. Each of the received messages may include or be provided with an identifier (e.g., flag, value, code, etc.) that the message is associated with a specific topic. Messages having a particular topic associated therewith may be processed by one or more different state machines.

At operation 710, one or more state machines of a scenario characterization system and process herein may be initialized. Each state machine is preconfigured with a plurality of specified state parameters to define a specific scenario for each respective state machine. The initializing of operation 710 functions, in part, to commence an execution of the one or more state machines. In an application where more than one scenario type may be detected and analyzed, there may be a preconfigured state machine corresponding to each of the scenario types to be processed. For example, for a use case configured to process (1) an approaching traffic scenario, (2) a cut in scenario, (3) a forced merge scenario, (4) an automated lane change scenario, (5) a manual lane change scenario, and (6) a vehicle on shoulder scenario, six different state machines may be preconfigured and implemented to process messages having a topic corresponding to the scenario type of each state machine, where each state machine is dedicated to processing messages having a particular associated topic.

Operation 715 includes querying the plurality of messages by the one or more state machines. Each state machine may query for certain messages based on the topic associated with the messages. Each state machine queries for messages associated with a topic used by the scenario type defined by that state machine. For example, a cut in state machine may query for messages having an associated cut in topic, an approaching traffic state machine may query for messages having an associated approaching traffic topic, a forced merge state machine may query for messages having an associated forced merge topic, and likewise for the other scenario-specific state machines herein. In some instances, multiple different state machines may access one or more messages having a same associated topic.

At operation 720, the one or more state machines are updated based on state transitions determined for each respective state machine based on their received messages. The state machines are updated at each of a sequence of time intervals of a time period. For example, the received messages may represent an operational run of a truck that occurred over a four hour period of time and the state machines, at every 0.1 second time interval beginning at a start time of the run and ending at a stop time of the run, may be updated per the information included in the messages for each designated point in time. Operation 720 may operate to capture transitions from a previous state associated with a last time interval (i.e., "tick") and a transition to a current state associated with a current time interval or tick.

At operation 725, a scenario record for each of the one or more state machines may be updated based on each of the updated one or more state machines. The updating of the scenario record at operation 725 may ensure that the scenario record for each state machine accurately reflects the contemporaneous state of each of the state machines for a particular tick. The updated scenario records may be stored in a database, data store, data mart, or other storage facility at 730. In some embodiments, the database storing the updated scenario records may be queried using a variety of query techniques. In one embodiment, a query layer may be integrated into a database storing the updated scenario records, while in another embodiment, a (e.g., cloud-based) query service or application might be configured to access the database storing the updated scenario records to provide query search, analysis, and reporting functionalities.

In an example embodiment, for the cut in type of scenario, a monitor (starting with an initialization of the state machine) looks at the adjacent lane(s), determines the objects in the adjacent lanes, and determines whether any of the objects in the adjacent lane(s) are configured in such a way that they may cut-in front of the ego vehicle. In order to cut in, an object would need to be ahead of us, adjacent to us, or behind us to be a potential cut-in. At the next tick, the objects will have moved in space, and their positions are again checked to update the state for each of the objects. Over a period of time comprising a number of ticks within an operational run, one or more objects might have moved in front of the ego vehicle (e.g., truck), wherein such observed behavior of the objects, and optionally other data/ conditions that may factor in determining whether the cut-in scenario is satisfied, may be characterized as a cut-in. A record may be generated for the determined scenario characterization and stored in a database, including metadata associated with the particular scenario (e.g., start and stop times, traffic density, weather conditions, etc.).

In some instances, information other than raw sensor data may be stored in a scenario record. For example, such other or additional information might include which side of the truck a cut-in object is coming from, vehicle type for other vehicles, different states depending on the scenario (e.g., for a cut-in scenario type, details regarding a viewed object (e.g., its id, vehicle type, start time and stop time for each state, etc.). At least part of this additional information may be represented as metadata included in a scenario record. In some aspects, the plurality of states used to define a scenario, and the processing of messages at relatively short intervals (e.g., every 0.1 second) combined in a scenario record might provide context for a sequence of events comprising a scenario herein. The addition of metadata to a scenario record in some embodiments herein may provide additional context that might be revealed by an analysis (e.g., aggregation, transformation, etc.) of stored scenario records.

In some embodiments, a scenario characterization process herein takes a subset of the recorded messages generated by a vehicle, filters on a preset number of "topics" that are published on the truck at different rates, continuously. In a first pass, the scenario characterization process might not initially filter on time. The scenario characterization process may tick through an entire run in 0.1 second increments (for example) to determine whether the states of the included state machines are satisfied by the recorded conditions for a particular scenario. For example, in a cut in type of scenario example, the status of adjacent objects may be continually monitored to determine whether they move from an adjacent status to a location in front of the ego vehicle, which would satisfy a threshold criteria for the cut-in scenario.

In some embodiments, a scenario characterization processor or pipeline herein might not initially filter received messaged based time on an initial pass of data. The scenario characterization processor or pipeline might look at all of the data in a run and each state machine may classify or determine whether its specific type of event or scenario happened based on the transitions.

Figure 8:
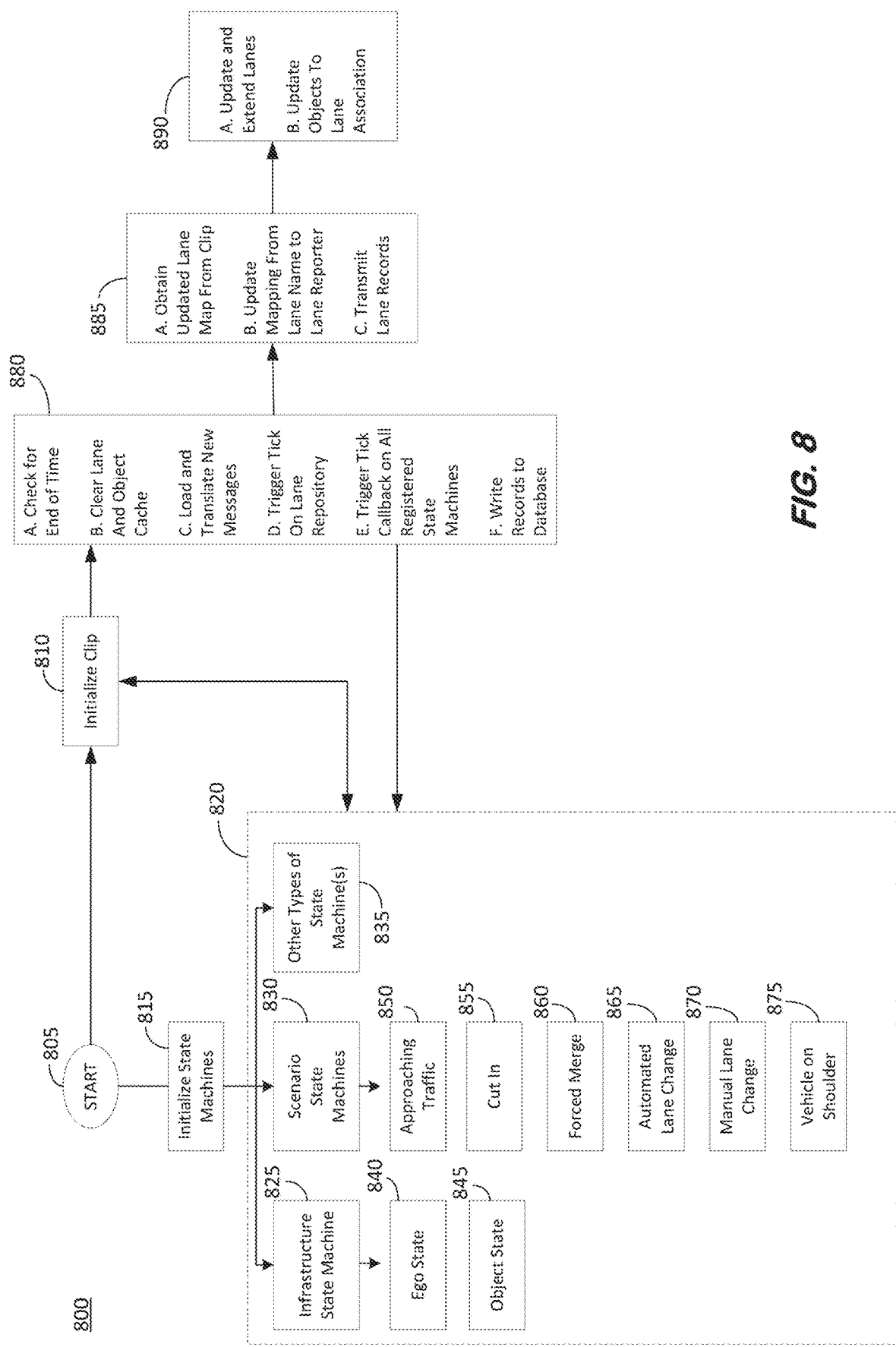
FIG. 8 is an illustrative depiction of an architecture or framework for a scenario characterization processor or pipeline, in accordance with an example embodiment.

FIG. 8 is an illustrative depiction of an architecture or framework 800 for a scenario characterization processor or pipeline, in accordance with an example embodiment. At a start or entry point 805 to the process, a script, program, service, or application is executed that initializes a clip including messages representing an operational run of a vehicle and initializes state machines of the characterization processor or pipeline. In some aspects, the initialization includes facilitating a registration of callbacks between the clip and the state machines included in the characterization processor or pipeline. The initialization may, for clip 810, include providing a clip identifier, initializing a time, a map, a lane repository, a message queue, and other aspects. The initialization may further include initializing 815 the state machines 820, including infrastructure state machines 825, scenario state machines 830, and other types of state machines 835 (if used). In the example of FIG. 8, the infrastructure state machines include ego state machine 840 and an object state machine 845; and the scenario state machines 830 include state a machine for each of the different scenario types, including approaching traffic 850, cut in 855, forced merge 860, automated lane change 865, manual lane change 870, and vehicle on shoulder 875.

The initialization of the clip starts a continuous "ticking" through the sequence of events represented by the messages in the clip. A timer setup by a scenario characterization controller or processor continuously analyzes the messages at a defined interval from a start of the clip until the end of the clip (i.e., the duration of an operational run).

For each tick in the clip, the operations shown at 880 are executed. These operations include (A) checking for an end of time in a message, (B) clearing lane and object cache, (C) loading and translating new messages, (D) triggering tick on lane repository, (E) triggering tick callback on all registered state machines 825 so that the registered state machines are updated for the current tick, and (F) writing a scenario record to a scenario record (or other designated) database every tick.

At 885, a lane repository manages mappings from a relative name (e.g., left, right, ego, etc.) to lane reporters, as well as detecting and managing when the ego vehicle crosses over a lane line. For a lane repository, (A) an updated lane map is obtained from the clip, (B) the mapping from relative lane to lane reporter is updated, and (C) lane records are output on every tick.

At 890, on a lane reporter tick, a lane reporter is updated. The lane reporter manages an underlying map (e.g., "lane refs") including segments of a lane, the traversal of the "lane refs" as the vehicle drives, and tracks an association of objects in the subject lanes. In some aspects, operation 890 includes (A) updating and extending lanes, and (B) updated objects to lane associations on every tick.

In some embodiments, all of the different scenario state machines are continuously running, looking/monitoring for the occurrence of an initial condition that triggers a processing through the state machine for that particular scenario. In some embodiments, there may be one or more conditions that reset a state machine (e.g., lost detection of the object, other conditions not met, etc.).

In some aspects, architecture 800 is a general framework that one or more scenario characterization processes herein might generally follow. In some instances, embodiments of different scenario characterization processes may be customized within framework 800.

Figure 9:
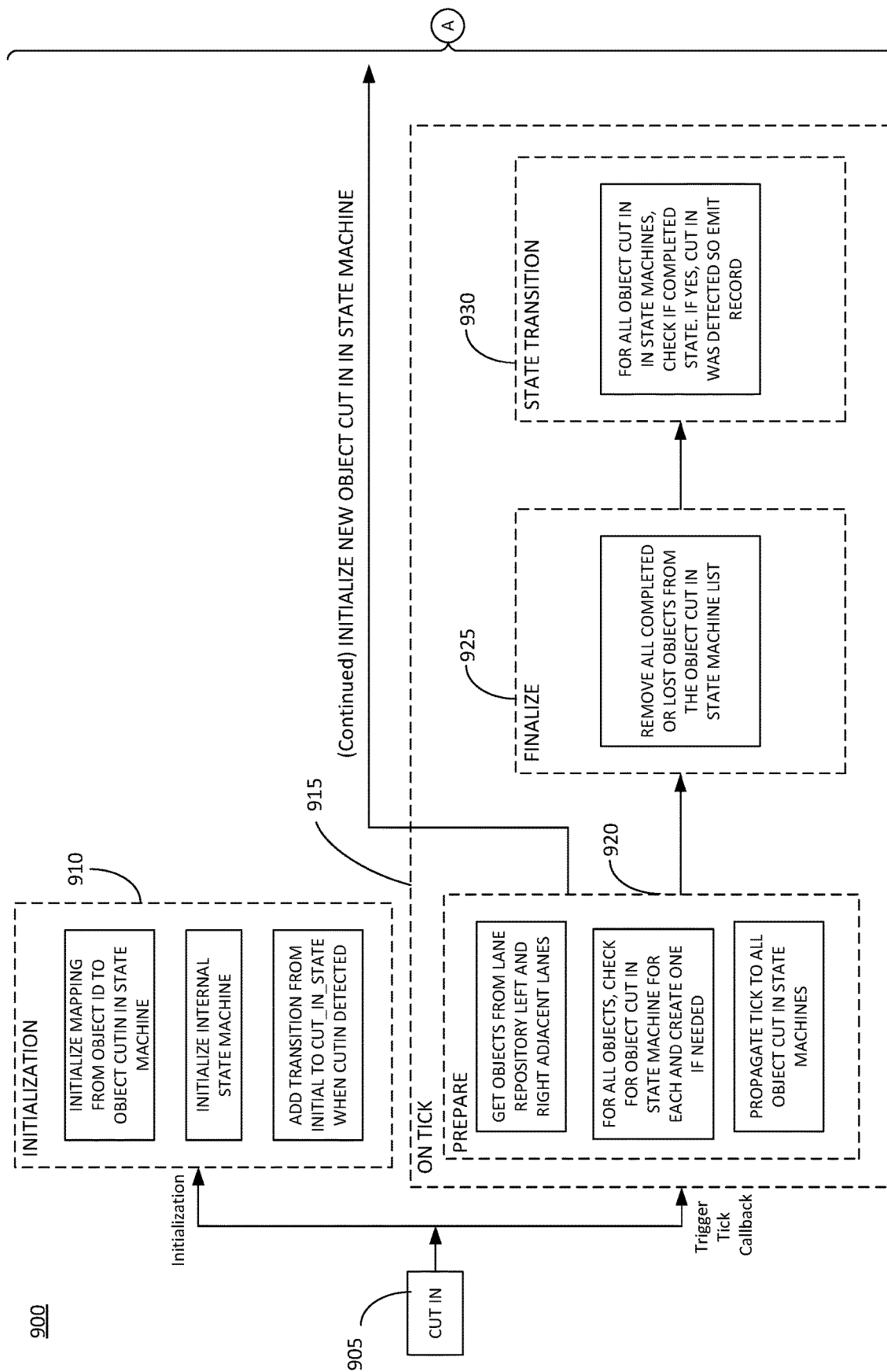
FIG. 9 is an illustrative depiction of a scenario characterization processor including a state machine for cut in scenario, in accordance with an example embodiment.

FIG. 9 is an illustrative depiction of a scenario characterization process 900, including a state diagram for a cut in type of scenario, in accordance with an example embodiment. For a cut in scenario type 905, an initialization occurs at 910. The initialization includes (A) initializing mapping from object ID to object cut in in the state machine, (B) initializing the internal state machine, and (C) adding a transition from an Initial state to a Cut In state. FIG. 9 further shows operations that are performed on each tick, including preparing the state machine at 920, generating a record for a completed cut in state at 925, and finalizing the scenario characterization at 930 in the event the cut in scenario is completed. FIG. 9 illustrates the initialization process further includes, at 935, (A) initializing the start and end times, set object ID, and other aspects and (B) initializing the cut in state machine 935. A logical flow for state machine 935 is shown in FIG. 9, including the relationships between the various states therein. At 940, in response to the trigger tick callback (i.e., once for each tick) operations performed include preparing the state machine including obtaining the most recently detected object with the subject object ID, generating a record for a completed cut in state for the subject object based on the state indicated in the message per state machine 935, and finalizing the scenario characterization for the subject object by updating the cut in state for the object.

Figure 10:
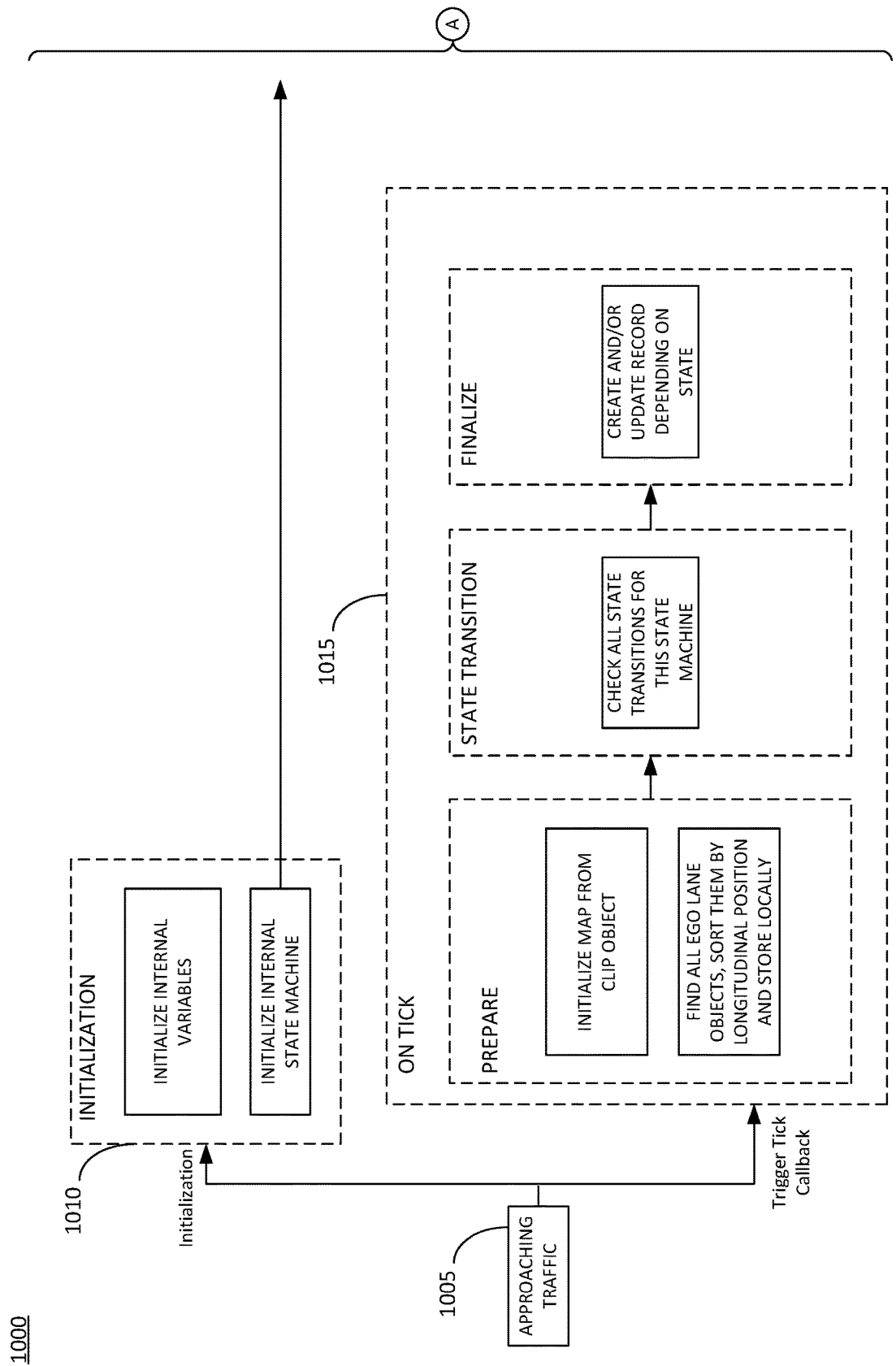
FIG. 10 is an illustrative depiction of a scenario characterization processor including a state machine for an approaching traffic scenario, in accordance with an example embodiment.

FIG. 10 is an illustrative depiction of a scenario characterization process 1000, including a state diagram, for an approaching traffic type of scenario, in accordance with an example embodiment. The scenario characterization process 1000 in FIG. 10, upon an indication or determination that an approaching traffic is included in the messages of an operational run at 1005, commences an initialization operation 1010, including the initialization of the approaching traffic state machine 1020. Following the general framework disclosed in FIG. 8, scenario characterization process 1000 includes preparation, state transition, and scenario record finalization operations at 1015.

In some aspects, FIGS. 9 and 10 illustrate the capability of the framework disclosed in FIG. 8 to accommodate different and varied scenario characterization processes. For example, the framework of FIG. 8 is not limited to any particular state machine or initialization processes that might be used for a particular state machine. Other scenario characterization processes, though not explicitly disclosed in a scenario characterization process including a detailed state machine as shown in FIGS. 8 and 9, are encompassed within the present disclosure.

Figure 11:
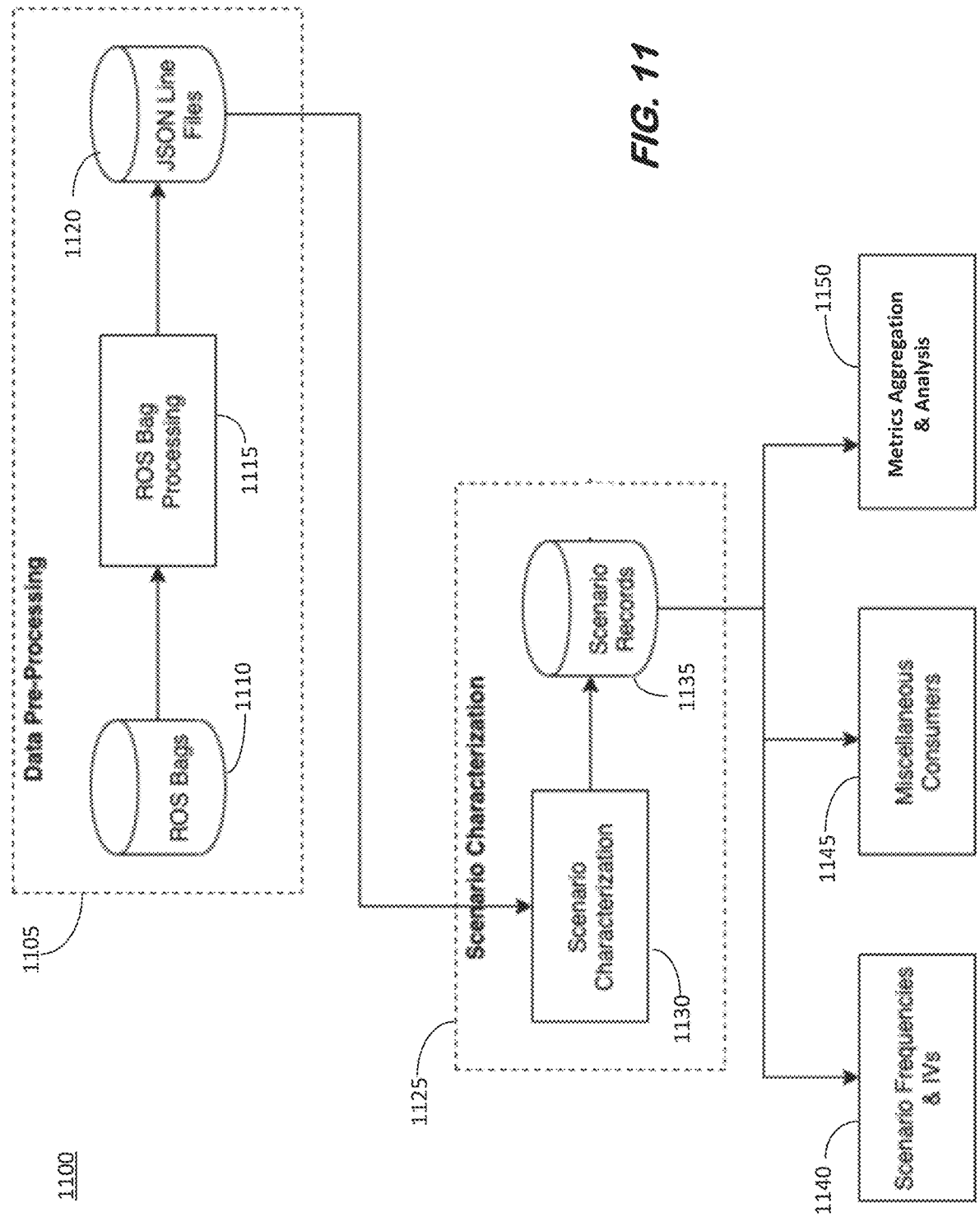
FIG. 11 is an illustrative block diagram of a system including a scenario characterization processor, in accordance with an example embodiment.

FIG. 11 is an illustrative block diagram of a system 1100 including a scenario characterization processor, in accordance with an example embodiment. As shown, FIG. 11 includes a data pre-processing stage 1105 that receives data files 1110 (e.g., ROS bagfiles) of recordings from a vehicle. These files are processed at 1115, including filtering the messages in the files by a specified list of topics each corresponding to a different scenario type to generate files of the filtered messages 1120 (e.g., compressed JSONl files). Scenario characterization stage 1125 includes a scenario characterization processor 1130 that receives the filtered message files from the data pre-processing stage and generates an output of scenario characterization records (e.g., JSONl formatted files) that are stored at database 1135. In some aspects, scenario characterization processor 1130 may operate to aggregate distinctive features and characteristics of different scenarios represented in the messages recorded by the vehicle, where the state machine for each scenario updates its internal state based on the messages available at each tick time of an operational run represented by the recorded messages processed through the scenario characterization processor 1130. FIG. 11 further shows the scenario records generated by scenario characterization processor 1130 may be used in a number of different, practical (i.e., real world) applications or use cases. For example, a scenario frequencies and IVs (interventions) stage 1140 may use the scenario records to generate aggregated information about scenario frequencies and IVs. In some embodiments, scenario records database 1135 might be selectively attached to a data visualization tool or analytics platform at 1140 where the frequencies of scenarios and success rates of these scenarios (based on IVs during the scenario) may be used to, for example, assess the readiness of a new software release. In some instances, one or more miscellaneous consumers (e.g., third parties) may use the generated scenario records for various research and/or commercial purposes. For example, in some embodiments, scenario records from scenario records database 1135 might be selectively provided to miscellaneous customers 1145 for various purposes. In one example use case, an autonomous vehicle (AV) engineer might query different VOS scenarios to determine where in the collected data to look for a VOS wherein the vehicle was encroaching in our lane. One application might include a metrics and analysis processor that consumes the scenario records to gain greater insight into the metrics recorded by the truck. In some embodiments, scenario records from scenario records database 1135 might be used for metrics aggregation and analysis processing 1150. For example, surrogate safety metrics might be calculated based on the different actors in particular scenarios. For instance, metrics aggregation and analysis processing 1150 might calculate a time to collision (TTC) and post-encroachment time (PET) of the cut-in object during a cut-in scenario.

In some embodiments, a database (e.g., FIG. 11, database 1135) storing or managing scenario characterization records may include and/or integrate with an application, service, or platform that provides at least some enhanced querying functionality on top of storing the records in the database. In some aspects, a system and a process herein may, in addition to the disclosed scenario characterization determinations, provide a mechanism to query the scenario records for specific conditions and/or features of interest. For example, a query might be generated and executed to retrieve a cut-in in dense traffic, where the vehicle was travelling below 20 mph, there 100 objects within the entire scene, there 20 objects in our destination lane for the lane change, and (optionally) other search constraints. Accordingly, a number of different and varied querying layers (e.g. combinations of search criteria) can be used in some embodiments to gain a greater insight into the recorded scenario characterization data. The querying layers can be used to, for example, understand and characterize an overall driving experience/run. For example, complex queries may be formulated and executed to return search results including (or excluding) certain specific scenario records. Metrics may be extracted from the scenario characterization records to better understand the performance of the truck in each of a queried scenario and/or combination of scenarios.

In some embodiments, generated scenario records may be configured and used in "datasets", where a dataset might include scenario records satisfying a specified criteria such as, for example, scenario records including one or more particular types of determined scenario characterization. In some instances, the scenarios might be packaged into a dataset that may be used by different personnel (e.g., organizations, etc.) for further feature development and/or improvements of an autonomous vehicle. In one example, planning engineers and prediction engineers might each use a dataset resulting from one or more query layer queries to develop new and/or improve on existing features of a vehicle.

In an example of an automated process, scenario characterization records might be automatically polled for the inclusion (or exclusion) of specific scenarios, where the scenario records including the desired scenarios may be retrieved from a database and sent to an entity (e.g., a third party) for labelling of objects in the scenario records. This use case might be used to inform machine learning engineers of the labeled objects in a cut-in scenario (where each object is properly labeled throughout a run), as opposed to being used to inform the engineers the scenario is a particular (e.g., cut-in) scenario type.

In some aspects, a scenario characterization process disclosed herein based on state machines might define the different parts of a scenario, which might be helpful for different entities and analysts since different analysts might be interested in different, specific parts of a scenario, not just whether or not a particular scenario occurred. For example, a prediction engineer/analyst might be interested in the exact moment an object cuts into our lane, not simply whether the cut in occurred. In some instances, a state machine based scenario characterization process herein might generate a scenario record that includes the particular timestamp that an object crossed into our lane, based on state machine (e.g., transition states) in the scenario records. In some instances, a system and process herein may provide a more granular insight into the specific states comprising particular scenario.

Figure 12:
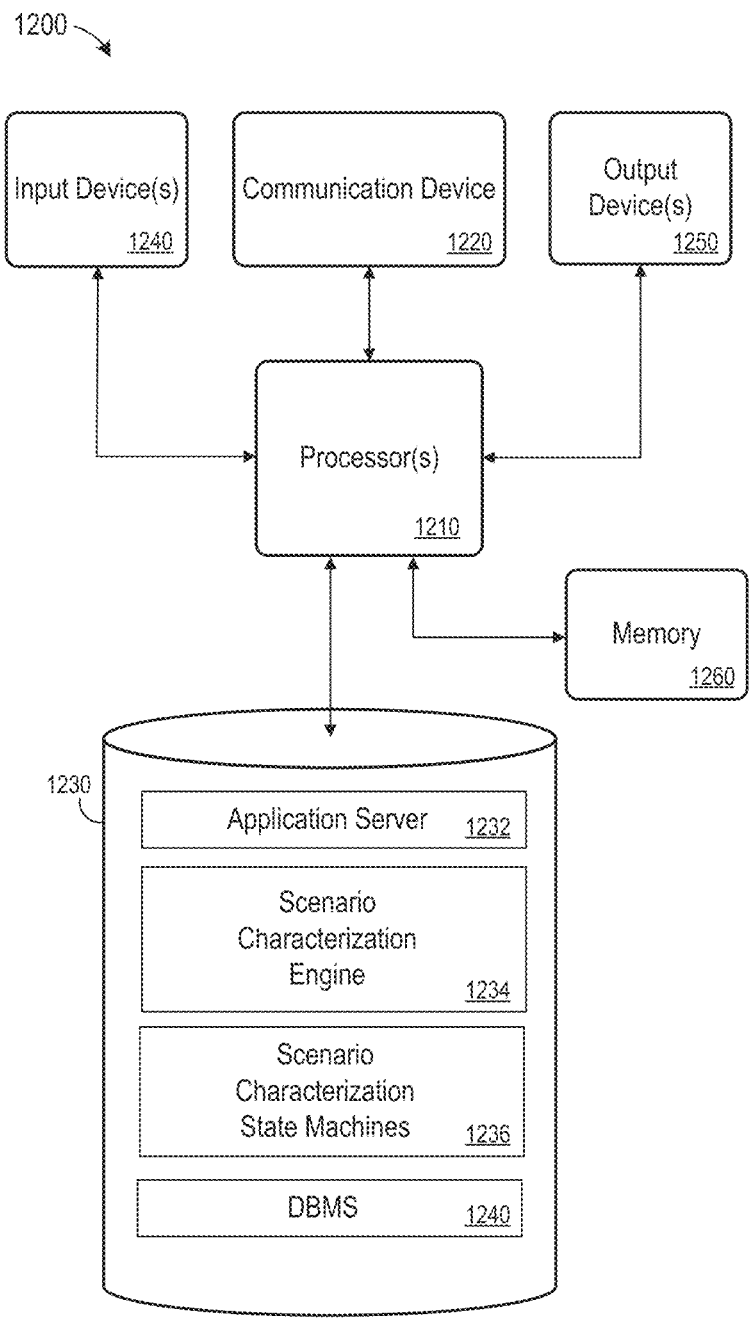
FIG. 12 is an illustrative block diagram of a computing system, in accordance with an example embodiment.

FIG. 12 illustrates a computing system 1200 that may be used in any of the architectures or frameworks (e.g., FIG. 8) and processes (e.g., FIGS. 6-11) disclosed herein, in accordance with an example embodiment. FIG. 12 is a block diagram of server node 1200 embodying a scenario characterization engine, according to some embodiments. Server node 1200 may comprise a general-purpose computing apparatus and may execute program code to perform any of the functions described herein. Server node 1200 may comprise an implementation of at least some features of the architecture of FIG. 8 in some embodiments. Server node 1200 may include other unshown elements according to some embodiments.

Server node 1200 includes processing unit(s) 1210 operatively coupled to communication device 1220, data storage device 1230, one or more input devices 1240, one or more output devices 1250, and memory 1260. Communication device 1220 may facilitate communication with external devices, such as an external network, a data storage device, or other data source. Input device(s) 1240 may comprise, for example, a keyboard, a keypad, a mouse or other pointing device, a microphone, knob or a switch, an infra-red (IR) port, a docking station, and/or a touch screen. Input device(s) 1240 may be used, for example, to enter information into apparatus 1200. Output device(s) 1250 may comprise, for example, a display (e.g., a display screen) a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, etc., while memory 1260 may comprise Random Access Memory (RAM).

Application server 1232 may each comprise program code executed by processor(s) 1210 to cause server 1200 to perform any one or more of the processes described herein. Scenario characterization process engine 1234 may execute one or more processes to implement a plurality of scenario characterization processes, each for a particular scenario type. Embodiments are not limited to execution of these processes by a single computing device. Data storage device 1230 may also store data and other program code for providing additional functionality and/or which are necessary for operation of server 1200, such as device drivers, operating system files, scenario characterization state machines 1236 preconfigured and used to implement scenario characterization processes (e.g., FIG. 7, process 700), etc. DBMS 1240 may store and manage a variety of data types and structures, including, for example, scenario records generated by scenario characterization processes herein.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
a memory storing computer instructions; and
a processor communicatively coupled with the memory to execute the instructions to perform operations, comprising:
receiving a plurality of messages generated by a vehicle during an operation of the vehicle, each of the messages being generated based on a combination of data collected onboard a vehicle during the operation of the vehicle including a combination of vehicle sensor data and a start and a stop time for an event in a scenario related to the operation of the vehicle, each of the messages being associated with an indicated scenario type and representing at least one scenario related to the operation of the vehicle, each scenario defining a sequence of driving events that occur with a predetermined relationship related to the vehicle;
initializing a plurality of state machines, each state machine preconfigured with one or more specified state parameters to define a specific scenario type, the initializing commencing an execution of the plurality of state machines;
querying the plurality of messages by each of the plurality of state machines, each state machine querying for messages having an indicated scenario type associated with the specific scenario type defined for each of the respective plurality of state machines;
updating, at each of a sequence of time intervals of a time period, the plurality of state machines based on state transitions determined for each of the respective plurality of state machines in response to the querying of the plurality of messages;
updating, based on each of the plurality of updated state machines, a scenario record for each of the plurality of state machines, the scenario record for each of the plurality of state machines including a state of each of the respective state machines for state transitions associated with the plurality of messages;
storing the updated scenario record in a data store;
transmitting the updated scenario record from the data store to a data processor to generate an aggregated characterization of scenarios having occurred during the operation of the vehicle and determine an assessment of a software used by the vehicle during the operation of the vehicle to generate the plurality of messages;
generating control signals for an autonomous vehicle in the at least one scenario based on the aggregated characterization of scenarios; and
controlling a throttle, steering, or brakes of the autonomous vehicle in the at least one scenario based on the generated control signals.

2. The system of claim 1, wherein each of the plurality of messages includes information representative of at least one of: sensor data obtained from a sensor on the vehicle, diagnostics information obtained from the vehicle, and messages transmitted between devices on the vehicle.

3. The system of claim 1, wherein the indicated topic is at least one of: an approaching traffic scenario, a cut in scenario, a forced merge scenario, an automated lane change scenario, a manual lane change scenario, and a vehicle on shoulder scenario.

4. The system of claim 1, wherein the time period represented by the plurality of messages includes at least one of a start time or an end time for an operational run for the vehicle.

5. The system of claim 4, wherein the plurality of messages are received after a conclusion of the operational run of the vehicle.

6. The system of claim 1, wherein the updating of the scenario record includes updating metadata associated with each scenario and the updated metadata is stored with the updated record.

7. The system of claim 1, wherein the one or more specified state parameters for each state machine define distinct portions of the specific scenario of each respective state machine.

8. A method, comprising:
receiving a plurality of messages generated by a vehicle during an operation of the vehicle, each of the messages being generated based on a combination of data collected onboard a vehicle during the operation of the vehicle including a combination of vehicle sensor data and a start and a stop time for an event in a scenario related to the operation of the vehicle, each of the messages being associated with an indicated scenario type and representing at least one scenario related to the operation of the vehicle, each scenario defining a sequence of driving events that occur with a predetermined relationship related to the vehicle;
initializing a plurality of state machines, each state machine preconfigured with one or more specified state parameters to define a specific scenario type, the initializing commencing an execution of the plurality of state machines;
querying the plurality of messages by each of the plurality of state machines, each state machine querying for messages having an indicated scenario type associated with the specific scenario type defined for each of the respective plurality of state machines;
updating, at each of a sequence of time intervals of a time period, the plurality of state machines based on state transitions determined for each of the respective plurality of state machines in response to the querying of the plurality of messages;
updating, based on each of the plurality of updated state machines, a scenario record for each of the plurality of state machines, the scenario record for each of the plurality of state machines including a state of each of the respective state machines for state transitions associated with the plurality of messages;
storing the updated scenario record in a data store;
transmitting the updated scenario record from the data store to a data processor to generate an aggregated characterization of scenarios having occurred during the operation of the vehicle and determine an assessment of a software used by the vehicle during the operation of the vehicle to generate the plurality of messages;
generating control signals for an autonomous vehicle in the at least scenario based on the aggregated characterization of scenarios; and
controlling a throttle, steering, or brakes of the autonomous vehicle in the at least one one scenario based on the generated control signals.

9. The method of claim 8, wherein each of the plurality of messages includes information representative of at least one of sensor data obtained from a sensor on the vehicle, diagnostics information obtained from the vehicle, and messages transmitted between devices on the vehicle.

10. The method of claim 8, wherein the indicated topic is at least one of an approaching traffic scenario, a cut in scenario, a forced merge scenario, an automated lane change scenario, a manual lane change scenario, and a vehicle on shoulder scenario.

11. The method of claim 8, wherein the time period represented by the plurality of messages includes at least one of a start time or an end time for an operational run for the vehicle.

12. The method of claim 11, wherein the plurality of messages are received after a conclusion of the operational run of the vehicle.

13. The method of claim 8, wherein the updating of the scenario record includes updating metadata associated with each scenario and the updated metadata is stored with the updated record.

14. The method of claim 8, wherein the one or more specified state parameters for each state machine define distinct portions of the specific scenario of each respective state machine.

15. A non-transitory machine-readable medium storing instructions that, when executed by at least one programmable processor, cause the at least one programmable processor to perform operations comprising:

receiving a plurality of messages generated by a vehicle during an operation of the vehicle, each of the messages being generated based on a combination of data collected onboard a vehicle during the operation of the vehicle including a combination of vehicle sensor data and a start and a stop time for an event in a scenario related to the operation of the vehicle, each of the messages being associated with an indicated scenario type and representing at least one scenario related to the operation of the vehicle, each scenario defining a sequence of driving events that occur with a predetermined relationship related to the vehicle;

initializing a plurality of state machines, each state machine preconfigured with one or more specified state parameters to define a specific scenario type, the initializing commencing an execution of the plurality of state machines;

querying the plurality of messages by each of the plurality of state machines, each state machine querying for messages having an indicated scenario type associated with the specific scenario type defined for each of the respective plurality of state machines;

updating, at each of a sequence of time intervals of a time period, the plurality of state machines based on state transitions determined for each of the respective plurality of state machines in response to the querying of the plurality of messages;

updating, based on each of the plurality of updated state machines, a scenario record for each of the plurality of state machines, the scenario record for each of the plurality of state machines including a state of each of the respective state machines for state transitions associated with the plurality of messages;

storing the updated scenario record in a data store;

transmitting the updated scenario record from the data store to a data processor to generate an aggregated characterization of scenarios having occurred during the operation of the vehicle and determine an assessment of a software used by the vehicle during the operation of the vehicle to generate the plurality of messages;

generating control signals for an autonomous vehicle in the at least one scenario based on the aggregated characterization of scenarios; and controlling a throttle, steering, or brakes of the autonomous vehicle in the at least one scenario based on the generated control signals.

16. The medium of claim 15, wherein each of the plurality of messages includes information representative of at least one of sensor data obtained from a sensor on the vehicle, diagnostics information obtained from the vehicle, and messages transmitted between devices on the vehicle.

17. The medium of claim 15, wherein the indicated topic is at least one of an approaching traffic scenario, a cut in scenario, a forced merge scenario, an automated lane change scenario, a manual lane change scenario, and a vehicle on shoulder scenario.

18. The medium of claim 15, wherein the time period represented by the plurality of messages includes at least one of a start time or an end time for an operational run for the vehicle.

* * * * *

UNITED STATES PATENT AND TRADEMARK OFFICE
CERTIFICATE OF CORRECTION

PATENT NO. : 12,358,518 B2
APPLICATION NO. : 17/484550
DATED : July 15, 2025
INVENTOR(S) : Marcus Sjolin and David Watson Page 1 of 1

It is certified that error appears in the above-identified patent and that said Letters Patent is hereby corrected as shown below:

In the Claims

Column 18 Claim 8, Line 63, please replace "the at least scenario based on the aggregated characterization" with "the at least one scenario based on the aggregated characterization".

Column 18 Claim 8, Line 65, please replace "autonomous vehicle in the at least one one scenario based on" with "autonomous vehicle in the at least one scenario based on".

Signed and Sealed this
Twenty-fifth Day of November, 2025

John A. Squires
*Director of the United States Patent and Trademark Office*